US010296083B2

(12) United States Patent
Sung

(10) Patent No.: US 10,296,083 B2
(45) Date of Patent: May 21, 2019

(54) DRIVER ASSISTANCE APPARATUS AND METHOD FOR CONTROLLING THE SAME

(71) Applicant: LG Electronics Inc., Seoul (KR)

(72) Inventor: Sinji Sung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 109 days.

(21) Appl. No.: 15/232,484

(22) Filed: Aug. 9, 2016

(65) Prior Publication Data

US 2017/0060234 A1 Mar. 2, 2017

(30) Foreign Application Priority Data

Aug. 26, 2015 (KR) .................. 10-2015-0120495

(51) Int. Cl.
*G06F 3/01* (2006.01)
*B60R 1/00* (2006.01)
(Continued)

(52) U.S. Cl.
CPC ............... *G06F 3/013* (2013.01); *B60R 1/00* (2013.01); *B60R 1/006* (2013.01); *B60R 1/008* (2013.01); *B60R 1/04* (2013.01); *B60W 50/14* (2013.01); *G06F 3/017* (2013.01); *G06F 3/038* (2013.01); *G06F 3/147* (2013.01); *G06F 3/1423* (2013.01); *G06F 3/1431* (2013.01); *G06F 3/167* (2013.01); *G06K 9/00335* (2013.01); *G06K 9/00845* (2013.01); *G06K 9/3233* (2013.01); *G08G 1/167* (2013.01); *G09G 5/003* (2013.01);
(Continued)

(58) Field of Classification Search
CPC .......... B60R 1/00; B60R 1/006; B60R 1/008; B60R 1/04; B60R 2300/205; B60R 2300/70; B60R 2300/8006; B60R 2300/8026; B60R 2300/804; B60W 2050/146; B60W 2420/42; B60W 50/14; G06F 2203/0381; G06F 3/01; G06F 3/038; G06F 3/1431; G06F 3/167; G06K 9/00845; G08G 1/167
See application file for complete search history.

(56) References Cited

U.S. PATENT DOCUMENTS 9,305,463 B1 * 4/2016 Yellambalase ... H04N 21/42203
2002/0003571 A1 * 1/2002 Schofield ................ B60C 23/00
348/148
(Continued)

FOREIGN PATENT DOCUMENTS

JP 2009-280015 A 12/2009
JP 2010-134639 A 6/2010
(Continued)

*Primary Examiner* — Kenneth Bukowski
(74) *Attorney, Agent, or Firm* — Birch, Stewart, Kolasch & Birch, LLP

(57) ABSTRACT

A driver assistance apparatus can include a display unit, a camera configured to capture an image of an interior of a vehicle, and a processor configured to sense a direction of at least one of a gaze and a gesture of a driver based on images provided from the camera, detect a region corresponding to the direction among a plurality of predetermined regions of the vehicle, and control the display unit to output information related to the detected region in response to an occurrence of an event related to the detected region among a plurality of predetermined events.

19 Claims, 31 Drawing Sheets

(51) Int. Cl.
  *B60R 1/04* (2006.01)
  *B60W 50/14* (2012.01)
  *G06F 3/14* (2006.01)
  *G06K 9/00* (2006.01)
  *G08G 1/16* (2006.01)
  *G06F 3/16* (2006.01)
  *G06F 3/038* (2013.01)
  *G06K 9/32* (2006.01)
  *G06F 3/147* (2006.01)
  *G09G 5/00* (2006.01)

(52) U.S. Cl.
  CPC ..... *B60R 2300/205* (2013.01); *B60R 2300/70* (2013.01); *B60R 2300/804* (2013.01); *B60R 2300/8006* (2013.01); *B60R 2300/8026* (2013.01); *B60W 2050/146* (2013.01); *B60W 2420/42* (2013.01); *G06F 2203/0381* (2013.01); *G09G 2320/0261* (2013.01); *G09G 2340/04* (2013.01); *G09G 2340/10* (2013.01); *G09G 2380/10* (2013.01)

(56) References Cited

U.S. PATENT DOCUMENTS

| | | | | |
|---|---|---|---|---|
| 2008/0012938 A1* | 1/2008 | Kubota | ................ | B60Q 9/008 348/118 |
| 2009/0079585 A1* | 3/2009 | Chinomi | ................ | B60R 1/00 340/901 |
| 2012/0154591 A1* | 6/2012 | Baur | ................ | B60R 1/00 348/148 |
| 2015/0010207 A1* | 1/2015 | Inada | ................ | B60K 35/00 382/103 |
| 2016/0300463 A1* | 10/2016 | Mahar | ................ | H04N 7/183 |

FOREIGN PATENT DOCUMENTS

| | | |
|---|---|---|
| JP | 2012-121387 A | 6/2012 |
| JP | 5630518 B2 | 11/2014 |
| KR | 10-2012-0119537 A | 10/2012 |
| KR | 10-2013-0117430 A | 10/2013 |
| KR | 10-2014-0058312 A | 5/2014 |
| WO | WO 2015/095849 A1 | 6/2015 |

* cited by examiner

FIG. 7B

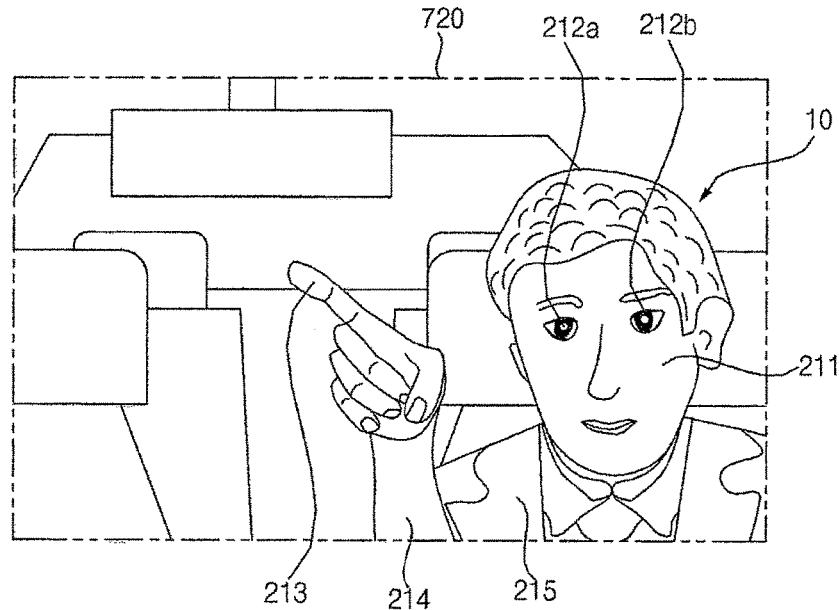

FIG. 7C

| Region | Event | Information |
|---|---|---|
| Left side-view mirror | Turn-on of left turn signal lamp | Left view image |
| Right side-view mirror | Turn-on of right turn signal lamp | Right view image |
| Rearview mirror | Approach of another vehicle within predetermined distance from back of vehicle<br>Sound of horn to rear of vehicle | Rearview image |
| | Voice of passenger | Passenger iamge |
| Center fascia | Movement of portable device in vehicle | Screen displayed on portable device |
| | Approach of vehicle within predetermined distance from object of interest | Route guide information |
| Windshield | Approach of vehicle within predetermined distance from object of interest | Information about object of interest |
| | Voice of driver commanding display of specific exterior image | Specific exterior image corresponding to voice of driver |
| | Forward movement of upper body of driver | Partial image corresponding to sensed direction in front view image |

DRIVER ASSISTANCE APPARATUS AND METHOD FOR CONTROLLING THE SAME

CROSS-REFERENCE TO RELATED APPLICATION

This application claims the priority benefit of Korean Patent Application No. 10-2015-0120495, filed on Aug. 26, 2015 in the Republic of Korea, the disclosure of which is incorporated herein by reference.

BACKGROUND OF THE INVENTION

1. Field of the invention

The present invention relates to a driver assistance apparatus and method for controlling the same and, more particularly, to a driver assistance apparatus for providing information related to driving and a method for controlling the same.

2. Description of the Related Art

A vehicle refers to an apparatus that transports people or freight from one place to another by driving wheels. For example, the vehicle may include a two-wheeled vehicle such as a motorcycle, and a four-wheeled vehicle such as a sedan and even a train.

To enhance safety and convenience in using a vehicle, technology for applying various sensors and electronic devices to the vehicle has been increasingly developed. In particular, various kinds of technology developed to enhance driving convenience for the user are installed in the vehicle.

In addition, the driver takes various actions while driving the vehicle. For example, the driver may look in side-view mirrors installed on both sides of the vehicle in order to check if there is an obstacle near the vehicle before changing lanes. However, averting the eyes away from the front-view while driving may cause danger not only to the driver but also to other passengers.

SUMMARY OF THE INVENTION

Therefore, the present invention has been made in view of the above problems, and it is an object of the present invention to provide a driver assistance apparatus for assisting the driver in looking ahead by determining information necessary for the driver based on at least one of gaze and a gesture of the driver and outputting the information on the windshield and a method for controlling the same.

Objects of the present invention are not limited to the aforementioned object, and other objects of the present invention which are not mentioned above will become apparent to those having ordinary skill in the art upon examination of the following description.

In accordance with an aspect of the present invention, the above and other objects can be accomplished by the provision of a driver assistance apparatus that can include a display unit, a camera to capture an image of an interior of a vehicle, a processor configured to sense a direction of one of a gaze and gesture of a driver based on images provided from the camera, detect a region corresponding to the direction among a plurality of predetermined regions of the vehicle, and control the display unit to output information related to the detected region in response to an occurrence of an event related to the detected region among a plurality of predetermined events.

Other details of embodiments are included in the following detailed description and accompanying drawings.

BRIEF DESCRIPTION OF THE DRAWINGS

The above and other objects, features and other advantages of the present invention will be more clearly understood from the following detailed description taken in conjunction with the accompanying drawings, in which:

FIG. 7B shows an image acquired by the camera of the driver assistance apparatus according to an embodiment of the present invention;

FIG. 7C shows an data structure defining a relationship among a plurality of predetermined regions, a plurality of predetermined events and a plurality of predetermined pieces of information according to an embodiment of the present invention;

DETAILED DESCRIPTION OF THE PREFERRED EMBODIMENTS

Figure 1A:
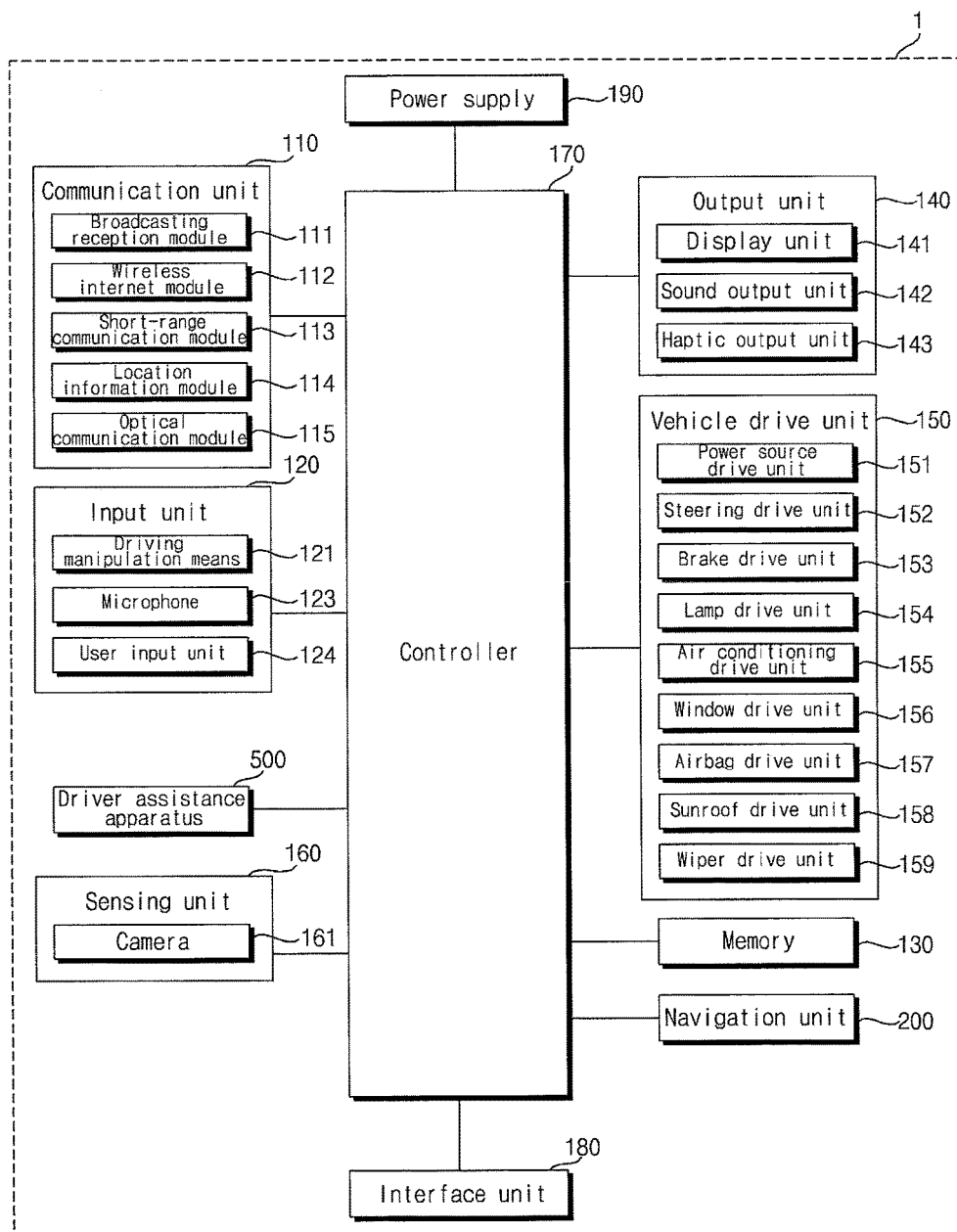
FIGS. 1A and 1B are block diagrams illustrating a vehicle according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest distinguished meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another one or another constituent may be interposed between the constituents. Further, stating that one constituent is "directly connected" or "directly linked" to another should be understood as meaning that no other constituent is interposed between the constituents. In addition, stating that one constituent "controls" another constituent should be understood as meaning not only a situation where one constituent directly controls another constituent, but also a situation where one constituent controls another constituent via a third constituent. In addition, stating that one constituent "provides" information or a signal to another constituent should be understood as meaning a situation where one constituent directly provides the information or signal to another constituent but also a situation where one constituent provides the information or signal to another constituent via a third constituent.

A singular expression includes a plural expression unless the two expressions are contextually different from each other.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The vehicle described in this specification may include a motor vehicle equipped with an internal combustion engine as a power source, a hybrid vehicle equipped with both an engine and an electric motor as a power source, and an electric vehicle equipped with an electric motor as a power source.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest distinguished meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

When one constituent is mentioned as being "connected" or "linked" to another, it should be understood that this means the one constituent may be directly connected or linked to another one or another constituent may be interposed between the constituents. On the other hand, when one constituent is mentioned as being "directly connected" or "directly linked" to another, it should be understood that this means no other constituent is interposed between the constituents. In addition, A singular expression includes a plural expression unless the two expressions are contextually different from each other.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The vehicle described in this specification may include a motor vehicle equipped with an internal combustion engine as a power source, a hybrid vehicle equipped with both an engine and an electric motor as a power source, and an electric vehicle equipped with an electric motor as a power source.

FIG. 1 is a block diagram illustrating a vehicle according to an embodiment of the present invention.

The vehicle 1 may include a communication unit 110, an input unit 120, a memory 130, an output unit 140, a vehicle drive unit 150, a sensing unit 160, a controller 170, an interface unit 180, a power supply 190, and a driver assistance system 500.

The communication unit 110 may include at least one module enabling wireless communication between the vehicle 1 and an external device (e.g., a portable terminal, an external server, other vehicles). The communication unit 110 may also include at least one module for connecting the vehicle 1 to at least one network.

The communication unit 110 may include a broadcast reception module 111, a wireless Internet module 112, a short-range communication module 113, a location information module 114 and an optical communication module 115.

The broadcast reception module 111 receives a broadcast signal or broadcast-related information from an external broadcast management server over a broadcast channel. Herein, the broadcast can include radio broadcast or TV broadcast.

The wireless Internet module 112, which refers to a module for wireless Internet access, may be internally or externally installed to the vehicle 1. The wireless Internet module 112 is configured to transmit and receive a radio signal on a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 112 transmits and receives data according to at least one of the aforementioned wireless Internet technologies. For example, the wireless Internet module 112 may wirelessly exchange data with the external server. The wireless Internet module 112 may receive weather information and traffic situation information (e.g., TPEG (Transport Protocol Expert Group)) from the external server.

The short-range communication module 113, which is intended for short-range communication, may support short-range communication using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (Wireless USB) technologies.

The short-range communication module 113 may establish a wireless local area network to implement short-range communication between the vehicle 1 and at least one external device. For example, the short-range communication module 113 may wirelessly exchange data with the portable terminal of a user. The short-range communication module 113 may receive weather information, and traffic situation information (e.g., TPEG (Transport Protocol Expert Group)) from the portable terminal or an external server. For example, when a user enters the vehicle 1, the portable terminal of the user may be paired with the vehicle 1 automatically or by execution of an application by the user.

A typical example of the location information module 114, which serves to acquire the location of the vehicle 1, is a global positioning system (GPS) module. For example, if the vehicle utilizes the GPS module, the location of the vehicle may be acquired using a signal from a GPS satellite.

The optical communication module 115 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some embodiments, the light transmitter may include an array of a plurality of light emitting devices. According to some embodiments, the light transmitter may be integrated with a lamp provided to the vehicle 1. For example, the light transmitter may be at least one of a headlight, a taillight, a brake light, a turn signal light, and a sidelight. For example, the optical communication module 115 may exchange data with another vehicle through optical communication.

The input unit 120 may include a driving manipulation means 121, a microphone 123 and a user input unit 124.

The driving manipulation means 121 receives user input for driving the vehicle 1. The driving manipulation means 121 may include a steering input means, a shift input means, an acceleration input means, a brake input means, and a turn signal means 121a (see FIG. 9B).

The steering input means receives a travel direction input of the vehicle 1 from the user. The steering input means may include a steering wheel. According to some embodiments, the steering input means may include a touchscreen, a touch pad, or a button.

The shift input means receives, from the user, inputs for Park (P), Drive (D), Neutral (N) and Reverse (R) of the vehicle 1. Preferably, the shift input means is formed in the shape of a lever. According to some embodiments, the shift input means may include a touchscreen, touch pad, or button.

The acceleration input means receives an input for accelerating the vehicle 1 from the user. The brake input means receives an input for decelerating the vehicle 1 from the user. Preferably, the acceleration input means and the brake input means are formed in the shape of a pedal. According to some embodiments, the acceleration input means or the brake input means may include a touchscreen, a touch pad, or a button.

The turn signal means 121a receives, from the user, an input for activating or deactivating a turn signal lamp of the vehicle 1. The turn signal means 121a may be referred to as a turn signal lever. At least one of a left turn signal lamp and a right turn signal lamp may be turned on or off in response to a user input through the turn signal means 121a. For example, if the turn signal lever is set at the neutral position, all the turn signal lamps of the vehicle may be turned off. If the turn signal lever is pulled down, only the left turn signal lamp of the vehicle may be turned on. If the turn signal lever is pushed up, only the right turn signal lamp may be turned on.

The microphone 123 may process a sound signal from the inside and/or outside of the vehicle 1 to create electrical data. The data created through processing may be utilized for various purposes according to functions being executed by the vehicle 1. The microphone 123 may convert a voice command from the user into electrical data. The electrical data may be delivered to the controller 170. According to an embodiment, the microphone 123 may include a microphone 123a (see FIG. 1B) disposed on one side in the interior of the vehicle 1 to receive sound generated by a person in the vehicle, and a microphone 123b (see FIG. 2) disposed at one side of the exterior of the vehicle 1 to receive sound from around the vehicle 1

The user input unit 124 is intended to receive information input by the user. When information is input through the user input unit 124, the controller 170 may control operation of the vehicle 1 in accordance with the input information. The user input unit 124 may include a touch input means or a mechanical input means. According to some embodiments, the user input unit 124 may be disposed in one area of the steering wheel. In this instance, the driver may manipulate the user input unit 124 with fingers while holding the steering wheel.

The sensing unit 160 senses a signal related to traveling of the vehicle 1. Thus, the sensing unit 160 may include a collision sensor, a steering sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, an interior temperature sensor, an interior humidity sensor, an ultrasonic sensor, an infrared sensor, radar, and lidar.

In addition, the sensing unit 160 may acquire vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information, and a sensing signal for sensing an angle by which the steering wheel is rotated. In addition, the driver assistance apparatus 500, which will be described later, may generate a control signal for acceleration, deceleration and change of the drive direction of the vehicle 1 based on the surrounding environment information acquired by at least one of the camera 161, ultrasonic sensor, infrared sensor, radar and lidar which are installed in the vehicle 1. Herein, the surrounding environment information may be information related to various objects positioned within a predetermined distance from the vehicle 1 while driving. For example, the surrounding environment information may include information on the number of objects positioned within 100 m from the vehicle 1, the sizes of the objects, types of the objects and the like.

The sensing unit 160 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 160 may include a biometric identification information sensing unit. The biometric identification information sensing unit senses and acquires biometric identification information of a passenger. The biometric identification information may include fingerprint information, iris-scan information, retina-scan information, hand geometry information, facial recognition information, and voice recognition information. The biometric identification information sensing unit may include a sensor for sensing biometric identification information of a person in the vehicle. The biometric identification information sensing unit may include a fingerprint sensor, an iris sensor, a weight sensor and a heart rate sensor.

The sensing unit 160 may include at least one camera 161 for capturing an image of the exterior of the vehicle 1. For example, the sensing unit 160 may include a plurality of cameras 161 disposed on different positions on the exterior of the vehicle. The camera 161 may include an image sensor (e.g., CMOS or CCD) and an image processing module. The camera 161 may process a still image or a moving image obtained by the image sensor. The image processing module may process the still image or moving image acquired through the image sensor, thereby extracting necessary information and delivering the extracted information to the controller 170.

The camera 161 may include an image sensor (e.g., CMOS or CCD) and an image processing module. The camera 161 may process a still image or a moving image obtained by the image sensor. The image processing module may process the still image or moving image acquired through the image sensor. In addition, the camera 161 may acquire an image including at least one of traffic light, a traffic signboard, a pedestrian, another vehicle and a road surface.

While the sensing unit 160 is illustrated as being included in the vehicle 1 in FIG. 1A, at least one sensor included in the sensing unit 160 may be included in the driver assistance apparatus 500 rather than in the vehicle 1.

The output unit 140, which serves to output information processed by the controller 170, may include a display unit 141, a sound output unit 142 and a haptic output unit 143.

The display unit 141 may display information processed by the controller 170. For example, the display unit 141 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 141 may include at least one of a liquid crystal display (LCD), a thin film transistor-liquid crystal display (TFT LCD), an organic light-emitting diode (OLED) display, a flexible display, a 3D display, and an e-ink display.

The display unit 141 may form a layered architecture together with a touch sensor or be integrated with the touch sensor, thereby implementing a touchscreen. Such touchscreen may function as the user input unit 124 providing an input interface between the vehicle 1 and the user and also as an output interface between the vehicle 1 and the user. In this instance, the display unit 141 may include a touch sensor for sensing touch applied to the display unit 141 in order to receive a control command in a touch manner. Thereby, when the display unit 141 is touched, the touch sensor may sense the touch, and the controller 170 may generate a control command corresponding to the touch. Content input through touch may include characters, numbers, or menu items which can be indicated or specified in various modes.

In addition, the display unit 141 may include a cluster to allow the driver to check the vehicle condition information or vehicle driving information during driving. The cluster may be positioned on the dashboard. In this instance, the driver can check the information displayed on the cluster while looking forward of the vehicle.

According to some embodiments, the display unit 141 may be implemented as a head up display (HUD). If the display unit 141 is implemented as the HUD, information may be output through a transparent display provided to the windshield. Alternatively, the display unit 141 may be provided with a projection module, thereby, outputting information through an image projected onto the windshield.

The sound output unit 142 converts an electrical signal from the controller 170 into an audio signal and outputs the audio signal. Thus, the sound output unit 142 may be provided with a speaker. The sound output unit 142 may output sound corresponding to operation of the user input unit 124.

The haptic output unit 143 generates haptic output. For example, the haptic output unit 143 may vibrate the steering wheel, a seat belt and a seat to allow the user to recognize the output.

The vehicle drive unit 150 may control operation of various vehicular devices. The vehicle drive unit 150 may include at least one of a power source drive unit 151, a steering drive unit 152, a brake drive unit 153, a lamp drive unit 154, an air conditioning drive unit 155, a window drive unit 156, an airbag drive unit 157, a sunroof drive unit 158 and a wiper drive unit 159.

The power source drive unit 151 may perform electronic control of the power source in the vehicle 1. The power source drive unit 151 may include an accelerator for increasing the speed of the vehicle 1 and a decelerator for decreasing the speed of the vehicle 1.

For example, if a fossil fuel-based engine is the power source, the power source drive unit 151 may perform electric control of the engine. Thereby, the output torque of the engine may be controlled. If the power source drive unit 151 is an engine, the output torque of the engine may be controlled by the controller 170 to limit the speed of the vehicle.

As another example, if an electric motor is the power source, the power source drive unit 151 may control the motor. Thereby, the rotational speed and torque of the motor may be controlled.

The steering drive unit 152 may include a steering apparatus. Thereby, the steering drive unit 152 may perform electronic control of the steering apparatus in the vehicle 1. For example, the steering drive unit 152 may include a steering torque sensor, a steering angle sensor and a steering motor. The steering torque which the driver applies to the steering wheel may be sensed by the steering torque sensor. The steering drive unit 152 may control the steering force and steering angle by changing the magnitude and direction of electric current applied to the steering motor based on the speed of the vehicle 1 and the steering torque. In addition, the steering drive unit 152 may determine whether or not the travel direction of the vehicle is properly controlled, based on the steering angle information acquired by the steering angle sensor. Thereby, the steering drive unit 152 can change the travel direction of the vehicle. In addition, when the vehicle travels at a low speed, the steering drive unit 152 may lower the resistance of the steering wheel by increasing the steering force of the steering motor. When the vehicle 1 travels at a high speed, the steering drive unit 152 may increase the resistance of the steering wheel by reducing the steering force of the steering motor. If the autonomous travel function of the vehicle 1 is executed, the steering drive unit 152 may control the steering motor to produce appropriate steering force based on a sensing signal output by the sensing unit 160 or a control signal provided by the processor 570 even if the driver manipulates the steering wheel (e.g., even if the steering torque is not sensed).

The brake drive unit 153 may perform electronic control of a brake apparatus in the vehicle 1. For example, by controlling the operation of the brakes disposed on the wheels, the speed of the vehicle 1 may be reduced. In another example, the brake disposed on a left wheel may be operated differently from the brake disposed on a right wheel in order to adjust the travel direction of the vehicle 1 to the left or right.

The lamp drive unit 154 may control at least one lamp disposed inside or outside the vehicle to be turned on/off. The lamp drive unit 154 may include a lamp device. In addition, the lamp drive unit 154 may control the intensity and direction of light emitted from each lamp included in the lamp device. For example, the lamp drive unit 154 may control a turn signal lamp, a headlamp, and a brake lamp.

The air conditioning drive unit 155 may perform electronic control of an air conditioner in the vehicle 1. For example, if the temperature of the interior of the vehicle is high, the air conditioning drive unit 155 may control the air conditioner to supply cool air to the interior of the vehicle.

The window drive unit 156 may perform electronic control of a window apparatus in the vehicle 1. For example, the window drive unit 156 may control opening or closing of the left and right windows on both sides of the vehicle.

The airbag drive unit 157 may perform electronic control of an airbag apparatus in the vehicle 1. For example, the unit may control the airbag apparatus such that the airbags are inflated when the vehicle is exposed to danger.

The sunroof drive unit 158 may perform electronic control of a sunroof apparatus in the vehicle 1. For example, the sunroof drive unit 158 may control opening or closing of the sunroof.

The wiper drive unit 159 may control window wipers provided to the vehicle 1. For example, when the wiper drive unit 159 receives, from the user input unit 124, user input commanding the wiper drive unit 159 to drive the wipers, the wiper drive unit 159 may perform electronic control of the number of driving times and driving speed of the wipers according to user input. As another example, the wiper drive unit 159 may automatically drive the wipers without any user input by determining the amount and intensity of rain based on a sensing signal from a rain sensor included in the sensing unit 160.

In addition, the vehicle drive unit 150 may further include a suspension drive unit. The suspension drive unit may perform electronic control of a suspension apparatus in the vehicle 1. For example, when a road surface is uneven, the unit may control the suspension apparatus to attenuate vibration of the vehicle 1.

The memory 130 is electrically connected to the controller 170. The memory 130 may store basic data for each unit, control data for controlling operation of each unit, and input/output data. When implemented through hardware, the memory 130 may include various storage devices such as a ROM, RAM, EPROM, flash drive, and hard drive. The memory 130 may store various kinds of data for overall operation of the vehicle 1 including a program for processing or controlling operation of the controller 170.

The interface unit 180 may serve as a path between the vehicle 1 and various kinds of external devices connected thereto. For example, the interface unit 180 may be provided with a port connectable to the portable terminal, thus being connected to the portable terminal through the port. In this instance, the interface unit 180 may exchange data with the portable terminal.

The controller 170 may control overall operations of the respective units in the vehicle 1. The controller 170 may be called an electronic control unit (ECU).

The controller 170 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 190 may be controlled by the controller 170 to supply electric power necessary for operation of respective constituents. In particular, the power supply 190 may receive power from, for example, a battery in the vehicle.

The controller 170 may receive navigation information from a navigation apparatus 200. Herein, the navigation information may include determined destination information, route information according to the destination, map information, or vehicle location information, wherein the map information and the vehicle location information are related to traveling of the vehicle.

Some of the constituents shown in FIG. 1A may not be essential in implementing the vehicle 1. Accordingly, the vehicle described in this specification may have more or fewer constituents than the constituents listed above.

Figure 1B:
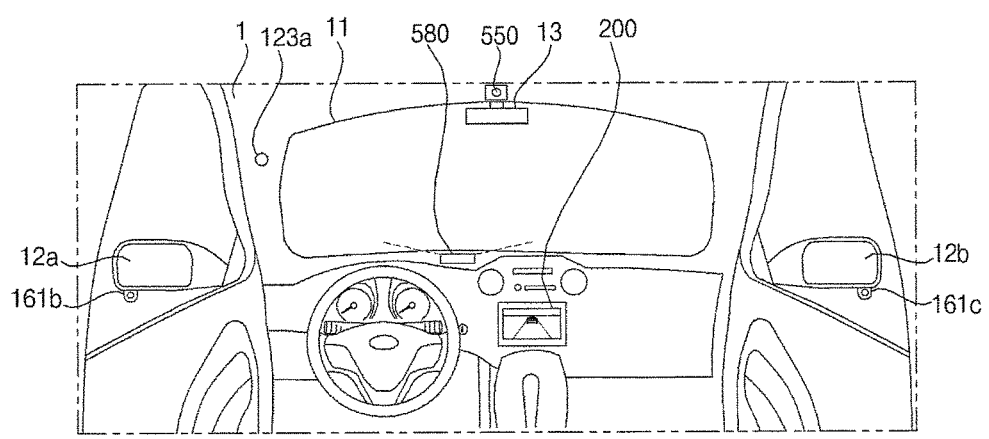

FIG. 1B shows an indoor view of the vehicle 1 shown in FIG. 1A according to an embodiment of the present invention.

Referring to FIG. 1B, the vehicle may be connected to the driver assistance apparatus 500 (see FIG. 5), which will be described later, in a wired or wireless manner to transmit images of the exterior the vehicle (e.g., a front view image, a left view image, a right view image, a rear view image) to the driver assistance apparatus 500.

In addition, the navigation apparatus 200 of the vehicle 1 displays navigation information on the touchscreen provided in the navigation apparatus. The navigation apparatus 200 may transmit, to the driver assistance apparatus 500, information about the destination of the vehicle 1 or a route leading to the destination.

Herein, the driver assistance apparatus 500 may be disposed in the vehicle and implemented as one constituent of the vehicle.

In addition, the driver assistance apparatus 500 may be connected to a portable device in the vehicle directly or via the vehicle 1 in a wired or wireless manner. Thereby, the vehicle may receive and output various kinds of information transmitted from the driver assistance apparatus 500. Of course, the driver assistance apparatus may receive and output various kinds of information transmitted from the vehicle.

Herein, a means supporting wireless communication such as a Wi-Fi transceiver and Bluetooth transceiver and a means supporting wired communication such as a USB (universal serial bus) terminal may be used as a communication means for exchange of information between the vehicle 1 and the driver assistance apparatus 500, between the vehicle 1 and a portable device in the vehicle 1 or between the driver assistance apparatus 500 and the portable device in the vehicle 1.

In addition, the vehicle 1 may acquire an exterior image of the vehicle by activating the camera 161 configured to capture images of the exterior of the vehicle and transmit the same to the driver assistance apparatus or a portable device connected to the vehicle 1 in a wired or wireless manner. Of course, it is apparent that the vehicle 1 can transmit the exterior image to a server located at a remote location.

Further, the driver of the vehicle 1 may be required to change gaze directions to deal with various situations which the driver encounters while driving the vehicle 1. For example, the driver may gaze at the left side-view mirror 12*a* to perform a left turn. After a left turn is completed, the driver may gaze from the left side-view mirror 12*a* to one area of the windshield 11. As another example, the driver may gaze from one area of the windshield 11 to the right side-view mirror 12*b* to change lanes. As another example, the driver may gaze from one area of the windshield 11 to the touchscreen of the navigation apparatus 200 in order to check the information on the route through which the driver is guided by the navigation apparatus 200 of the vehicle 1. As another example, the driver may gaze from one area of the windshield 11 to the rearview mirror 13 to check the situation behind the vehicle.

If the driver looks away from the road for a long time, this may result in a dangerous accident. Even if an accident does not occur, this behavior may present a great threat to pedestrians or other vehicles near the vehicle.

Thereby, the driver assistance apparatus 500 may detect the driver's behavior, for example, the gaze or gesture based on the indoor images of the vehicle provided from the camera 550 included therein. The driver assistance apparatus 500 may analyze images acquired by the camera 550, and detect and track at least one part of the driver's body such as the driver's face, pupils, hands, arms and head. As a result, the driver assistance apparatus 500 may recognize the direction in which the driver gazes and/or gestures.

The driver assistance apparatus may execute a specific function of the driver assistance apparatus or control a specific function of the vehicle or a portable device according to the direction of at least one of the gaze and gesture of the driver. In particular, the display unit 580 (see FIG. 5) of the driver assistance apparatus may be disposed at one side of the interior (e.g., the dashboard) of the vehicle 1, and output information related to at least one of the driver assistance apparatus, the vehicle 1 and the portable device in the vehicle 1 according to control of the processor 570 (see FIG. 5). According to one embodiment, the display unit 580 may include a head up display (HUD). The HUD may output various kinds of information to, for example, the windshield 11 of the vehicle 1. According to one embodiment, the display unit 580 may include a transparent display. For example, the transparent display may be disposed on or in the windshield 11 of the vehicle 1. Since the transparent display has a transmissivity higher than or equal to a certain level, the transparent display may not interfere with the front field of vision of the user and may allow the user to check various kinds of information related to the vehicle while looking ahead, when the transparent display is disposed on the windshield 11.

For example, if the driver looks in the left side-view mirror 12*a* when activating the left turn signal light, the driver assistance apparatus may output an exterior image corresponding to the gaze to the left side-view mirror 12*a*, determining that the driver desires left turn or lane change. In this instance, the exterior image may be provided from the left camera 161*b* included in the camera 161 shown in FIG. 1A.

As another example, if the driver looks in the right side-view mirror 12*b* when activating the right turn signal light, the driver assistance apparatus may output an exterior image provided from the right camera 161*c* included in the camera 161 shown in FIG. 1A. As another example, if the driver looks in the rearview mirror 13, the driver assistance apparatus may output a rear view image provided from the rear camera 161*d* included in the camera 161 shown in FIG. 1A.

In addition, if the driver assistance apparatus is connected to the vehicle in a wired or wireless manner, the driver may control operation of the driver assistance apparatus using the input unit 121 of the vehicle 1. For example, the driver assistance apparatus may be activated or deactivated in response to a voice command of the user received through the microphone 123*a* of the vehicle 1.

Figure 2:
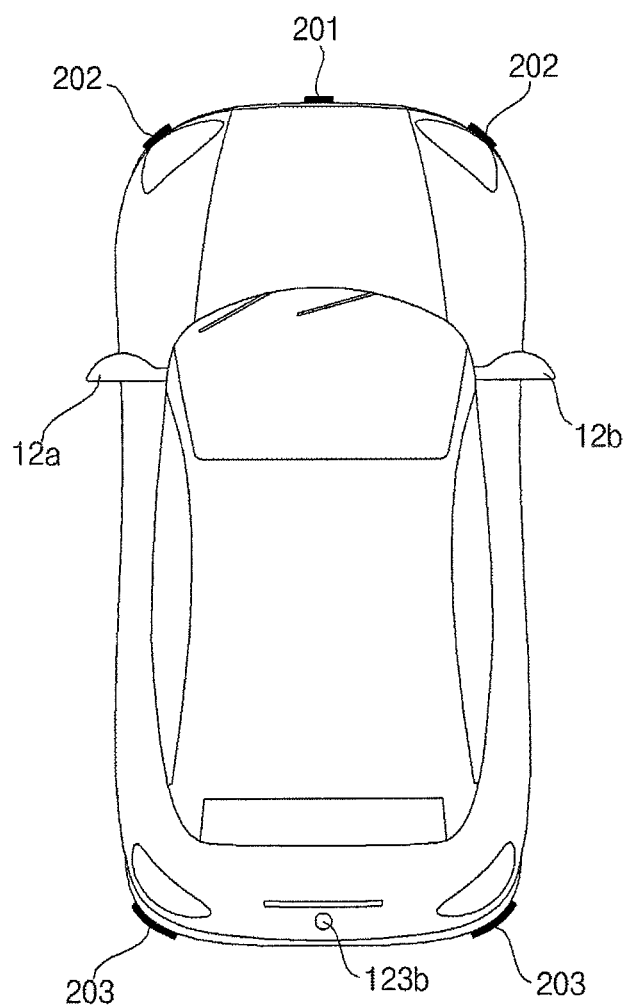
FIG. 2 illustrates an example of the vehicle illustrated in FIG. 1A according to an embodiment of the present invention.

FIG. 2 shows an example of the vehicle 1 described above with reference to FIG. 1A. For simplicity, it is assumed that the vehicle 1 is a four-wheeled automobile.

Referring to FIG. 2, the vehicle 1 may include at least one of a radar 201, a lidar 202 and an ultrasonic sensor 203.

The radar 201 may be installed on one side of the vehicle 1, emit an electromagnetic wave to the surroundings of the vehicle 1 and receive an electromagnetic wave reflected from various objects present around the vehicle 1. For example, the radar 201 may measure time taken for the electromagnetic wave to return after being reflected from an object, thereby acquiring information related to the distance, direction and altitude of the object.

The lidar 202 is installed on one side of the vehicle 1 to emit lasers toward the surroundings of the vehicle 1. Lasers emitted from the lidar 202 may return to the vehicle 1 after being scattered or reflected, and the lidar 202 may acquire information about physical properties such as the distance, speed, and shape of a target positioned near the vehicle 1, based on the time taken for the lasers to return, laser intensity, change in frequency and change in polarization.

The ultrasonic sensor 203 may be installed on one side of the vehicle 1 to emit ultrasound toward the surroundings of the vehicle 1. The ultrasound generated by the ultrasonic sensor 203 has a high frequency (higher than or equal to 20 KHz) and a short wavelength. The ultrasonic sensor 203 may be used to recognize an obstacle close to the vehicle 1.

The radar 201, lidar 202 and ultrasonic sensor 203 shown in FIG. 2 may be sensors included in the sensing unit 160 shown in FIG. 1.

Figure 3:
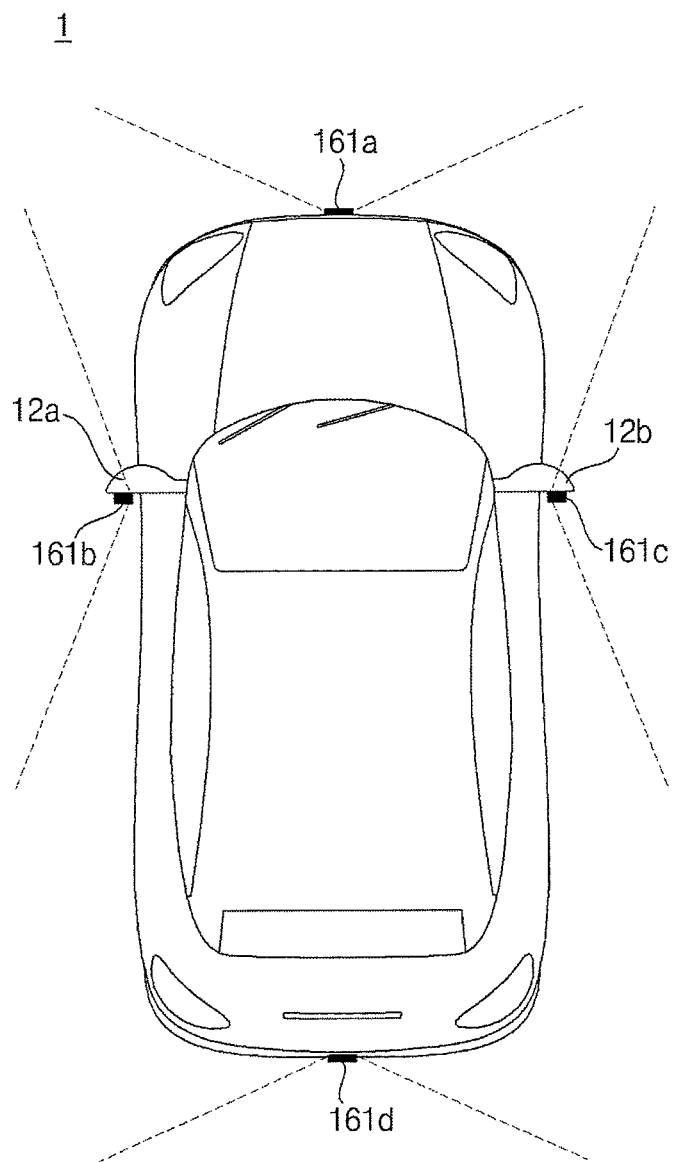
FIG. 3 shows an example of the vehicle illustrated in FIG. 1A according to an embodiment of the present invention.

FIG. 3 shows an example of the vehicle 1 described above with reference to FIG. 1A. For simplicity, suppose that the vehicle 1 is a four-wheeled automobile.

Referring to FIG. 3, four cameras 161a, 161b, 161c and 161d may be installed at different positions on the exterior of the vehicle 1. The four cameras 161a, 161b, 161c and 161d may be included in the camera 160 (see FIG. 1A).

The cameras 161a, 161b, 161c and 161d may be disposed on the front, left, right and back of the vehicle 1, respectively. The cameras 161a, 161b, 161c and 161d may be included in the camera 161 shown in FIG. 1A.

The front camera 161a may be disposed near the windshield, emblem or radiator grille.

The left camera 161b may be disposed in a case surrounding the left side-view mirror 12a. Alternatively, the left camera 161b may be disposed on the exterior of the case surrounding the left side-view mirror 12a. Alternatively, the left camera 161b may be disposed in one outer area of the left front door, left rear door or left fender.

The right camera 161c may be disposed in a case surrounding the right side-view mirror 12b. Alternatively, the right camera 161c may be disposed on the exterior of the case surrounding the right side-view mirror 12b. Alternatively, the right camera 161c may be disposed in one outer area of the right front door, right rear door or right fender.

The rear camera 161d may be disposed near the rear license plate or trunk switch.

Images captured by the plurality of cameras 161a, 161b, 161c and 161d may be delivered to the processor 570, and the processor 570 may synthesize the images to generate an image of the surroundings of the vehicle.

In addition, each of the cameras 161a, 161b, 161c and 161d shown in FIG. 3 may be identical to the camera 161 of the sensing unit 160 shown in FIG. 1A.

While FIG. 3 illustrates four cameras as being installed on the exterior of the vehicle 1, embodiments of the present invention are not limited thereto. It is apparent to those skilled in the art that more or less than four cameras may be installed at positions different from the positions shown in FIG. 3.

Figure 4:
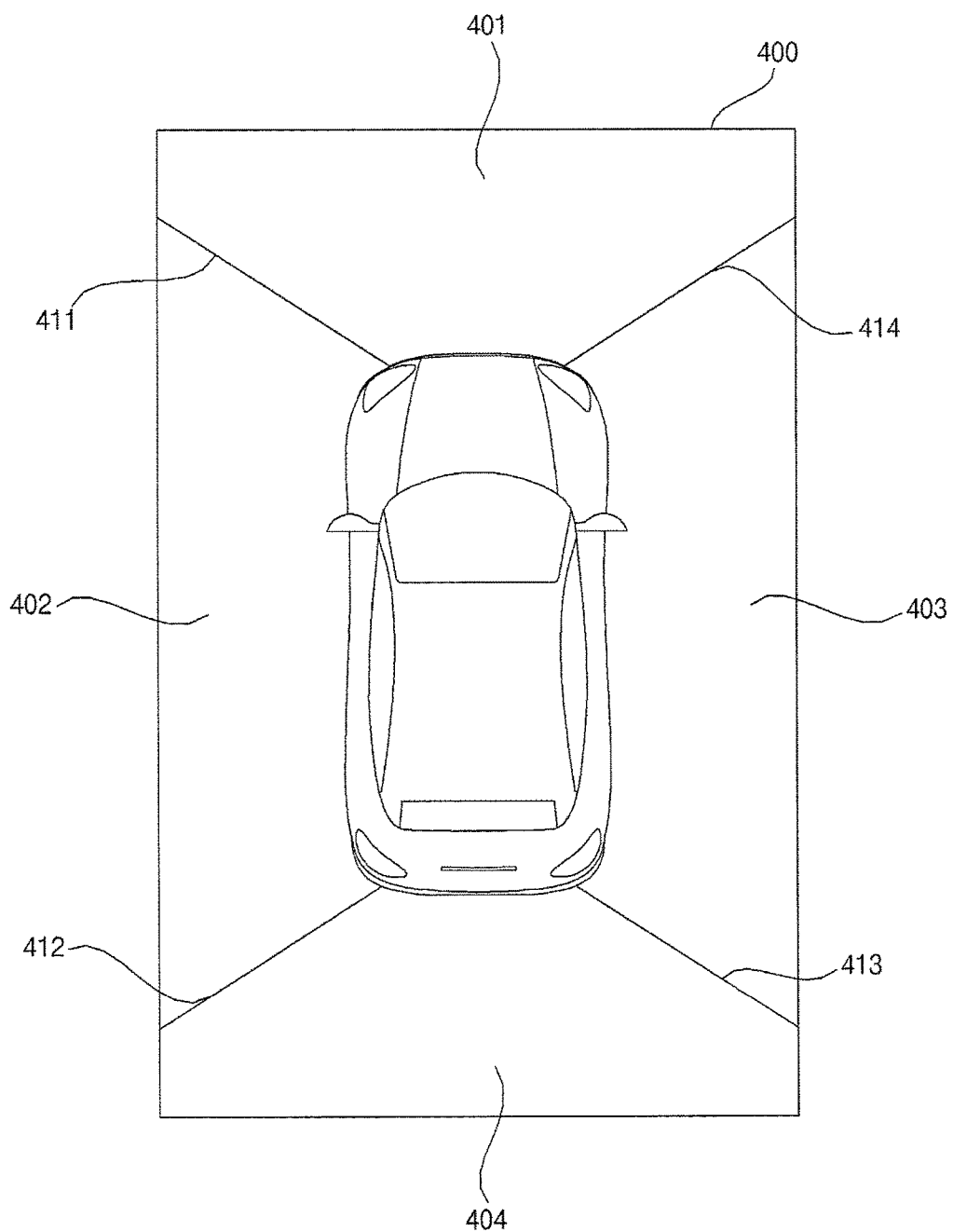
FIG. 4 shows an example of images generated by a plurality of cameras shown in FIG. 3 according to an embodiment of the present invention.

FIG. 4 shows an example of images generated by a plurality of cameras 161a, 161b, 161c and 161d shown in FIG. 3.

Referring to FIG. 4, a composite image 400 may include a first image area 401 corresponding to an exterior image captured by the front camera 161a, a second image area 402 corresponding to an exterior image captured by the left camera 161b, a third image area 403 corresponding to an exterior image captured by the right camera 161c, and a fourth image area 404 corresponding to an exterior image captured by the rear camera 161d. The synthetic image 400 may be referred to as an around view monitoring image.

When the composite image 400 is created, boundary lines 411, 412, 413 and 414 are generated among the respective exterior images. Such boundary may be processed through image blending to look natural when they are displayed.

In addition, the boundary lines 411, 412, 413 and 414 may be displayed on the respective boundaries between the images. In addition, a preset image indicating the vehicle 1 may be included in the middle of the composite image 400.

The composite image 400 may be displayed through the display apparatus installed in the interior of the vehicle 1.

Figure 5:
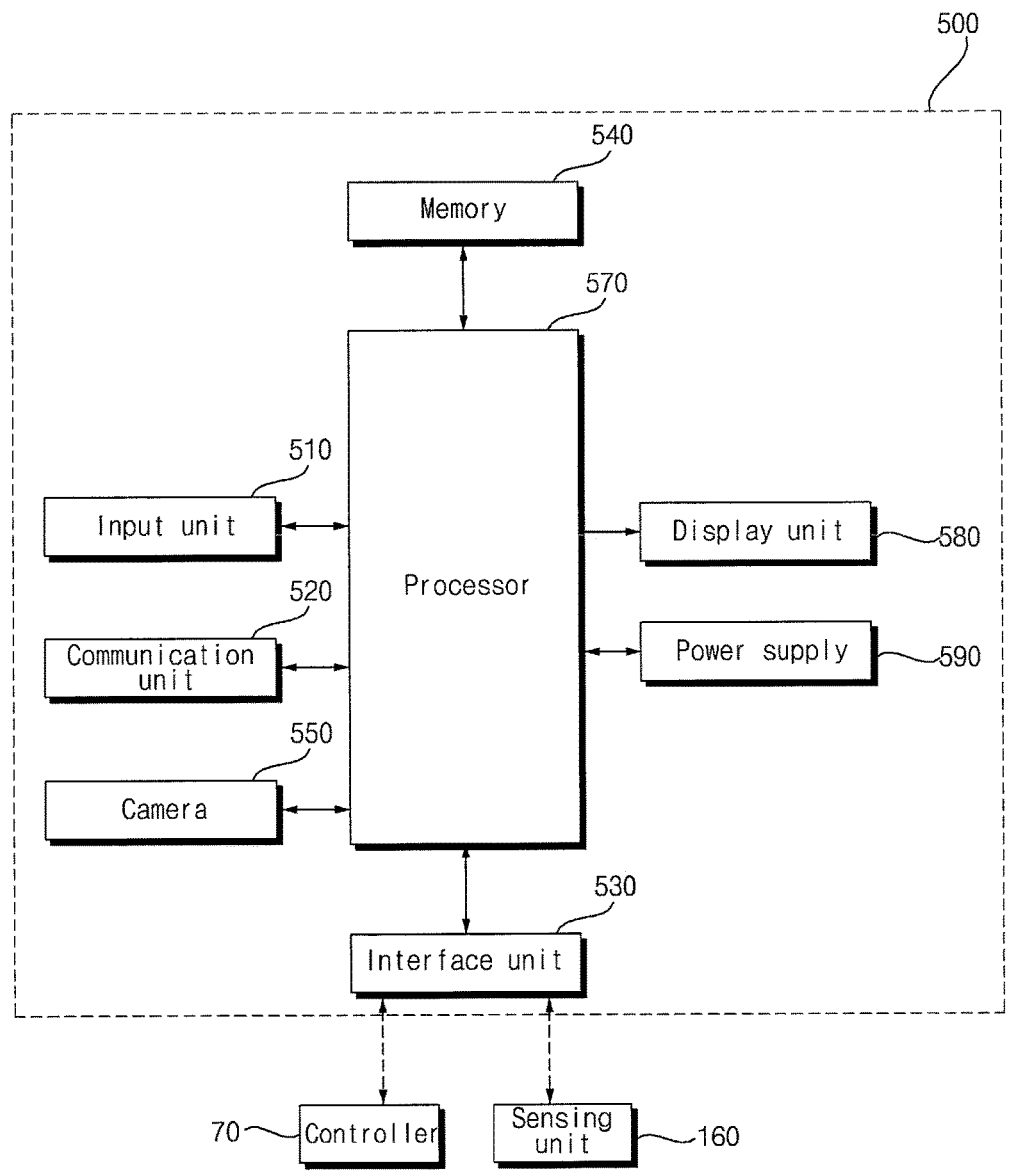
FIG. 5 is a block diagram illustrating a driver assistance apparatus according to an embodiment of the present invention.

FIG. 5 is a block diagram illustrating the driver assistance apparatus 500 according to an embodiment of the present invention.

The driver assistance system 500 may generate vehicle-related information by performing signal processing of an image received from the camera 161 shown in FIG. 1A, based on computer vision. Herein, the vehicle-related information may include vehicle control information for direct control of the vehicle or vehicle driving assistance information for assisting the driver in driving.

Referring to FIG. 5, the driver assistance system 500 may include an input unit 510, a communication unit 520, an interface unit 530, a memory 540, a processor 570, a display unit 580, and a power supply 590 according to an embodiment of the present invention. In some embodiments, some of the constituents shown in FIG. 5 may be omitted, or a new constituent may be further included in the driver assistance system 500. For example, some constituents included in the sensing unit 160 shown in FIG. 1A may be included in the driver assistance apparatus 500 rather than in the vehicle 1.

The input unit 510 may be equipped with a plurality of buttons or a touchscreen. The input unit 510 may turn on the driver assistance system 500 through the plurality of buttons or the touchscreen such that the driver assistance system 500 operates. Various input operations may also be performed through the buttons or touchscreen.

The communication unit 520 may wirelessly exchange data with external devices such as the portable terminal of a user in the vehicle or the server 500, an external server and another vehicle. In particular, the communication unit 520 may wirelessly exchange data with a portable terminal of the vehicle driver. Available wireless data communication schemes may include Bluetooth, Wi-Fi Direct, Wi-Fi, APiX, and NFC.

The communication unit 520 may receive weather information and traffic situation information, for example, TPEG (Transport Protocol Expert Group)) from an external server. The driver assistance system 500 may transmit recognized real-time information to an external device.

When a user enters the vehicle, the portable terminal of the user may be paired with the driver assistance system 500 automatically or by execution of an application by the user.

The communication unit 520 may receive change-of-traffic light information from the external server. Herein, the external server may be a server positioned at a traffic control center that controls traffic.

The interface unit 530 may receive vehicle-related or transmit a signal processed or generated by the processor 570. Thus, the interface unit 530 may perform data communication with the controller 170, the AVN apparatus, the sensing unit 160 and the like which are included in the vehicle through wired or wireless communication.

The interface unit 530 may receive navigation information through data communication with the controller 170 and the navigation apparatus 400. Herein, the navigation information may include determined destination information, route information according to the destination, map information, or current location information, wherein the map information and the current location information are related to traveling of the vehicle. The navigation information may include information about the location of the vehicle on the road.

In addition, the interface unit 530 may receive sensor information from the controller 170 or the sensing unit 160.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and object information.

Such sensor information may be acquired from a heading sensor, a yaw sensor, a gyro sensor, a position module, a vehicle drive/reverse sensor, a wheel sensor, a vehicle speed sensor, a vehicle body tilt sensor, a battery sensor, a fuel sensor, a tire sensor, a steering sensor based on turning of the steering wheel, an interior temperature sensor, an interior humidity sensor, an object sensor (e.g., radar, lidar, an ultrasonic sensor, etc.) and the like. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 530 may receive turn signal information. Herein, the turn signal information may be a signal for turning on a turn signal lamp for left turn or right turn input by the user. When an input 420 for turning on the left or right turn signal lamp is received through the user input unit 124 (see FIG. 1A) of the vehicle, the interface unit 530 may receive the left or right turn signal information.

The interface unit 530 may receive vehicle speed information, rotation angle information on the steering wheel or gearshift information. The interface unit 530 may receive the vehicle speed information, rotation angle information on the steering wheel or gearshift information sensed through the sensing unit 116 of the vehicle. Alternatively, the interface unit 530 may receive the vehicle speed information, rotation angle information on the steering wheel or gearshift information from the controller 170 of the vehicle. Herein, the gearshift information may be information about the position at which the gearshift of the vehicle is placed. For example, the gearshift information may be information about at least one of park (P), reverse (R), neutral (N), drive (D), and 1 to higher-stage gear positions.

The interface unit 530 may receive a user input which is input through the user input unit 124 of the vehicle 1. The interface unit 530 may receive the user input from the input unit 120 of the vehicle 1 or via the controller 170.

The interface unit 530 may receive information acquired from an external device. For example, when change-of-traffic light information is received from an external device through the communication unit 520 of the vehicle 1, the interface unit 530 may receive the change-of-traffic light information from the controller 170.

The memory 540 may store at least one program which is executable by the processor 570. In addition, the memory 540 may store various data which is retrieved, manipulated, changed or stored by the processor 570. The data stored in the memory 540 may include various kinds of information for processing or controlling overall operation of the driver assistance apparatus 500.

The memory 540 may store data for identifying an object. For example, if a predetermined object is detected in an image acquired through the cameras 161 and 530, the memory 540 may store data for identifying the object according to a predetermined algorithm.

The memory 540 may store data for traffic information. For example, if predetermined traffic information is detected in an image of the exterior of the vehicle 1 acquired through the camera 161, the memory 540 may store data for identifying the traffic information according to a predetermined algorithm.

The memory 540 may store data for determining a region to which at least one of the gaze and gesture of the driver of the vehicle 1 points. For example, if the interior of the vehicle 1 is partitioned into a plurality of predetermined regions, the memory 540 may store a plurality of three-dimensional coordinates corresponding to the respective partitioned regions. That is, each region may be defined by a plurality of three-dimensional coordinates. In addition, three-dimensional coordinates defined for one region may differ from three-dimensional coordinates defined for another region. If the direction of the gaze of the driver detected by the processor 570 at a certain time is expressed as one set of three-dimensional coordinates, the processor 570 may determine only one region associated with the three-dimensional coordinates corresponding to the gaze of the driver.

When implemented through hardware, the memory 540 may include various storage devices such as a ROM, RAM, EPROM, flash drive, and hard drive.

The processor 570 may control overall operation of each unit in the driver assistance system 500.

The processor 570 may process a front view image, left view image, right view image and/or rear view image of the vehicle provided from the camera 161. In addition, the processor 570 may possess images of the interior of the vehicle 1 acquired using the camera 550. In particular, the processor 570 performs signal processing based on computer vision. Thereby, the processor 570 may acquire an image of the front view or surroundings of the vehicle from the cameras 161 and 550, and may detect and track an object based on the image. In particular, in detecting an object, the processor 570 may perform lane detection (LD), vehicle detection (VD), pedestrian detection (PD), bright spot detection (BD), traffic sign recognition (TSR), and road surface detection.

A traffic sign may represent predetermined information which can be delivered to the driver of the vehicle 1. The traffic sign may be delivered to the driver through a traffic light, a traffic signboard or a road surface. For example, the traffic sign may be a Go or Stop signal output from a traffic light for vehicles or pedestrians. For example, the traffic sign may include various designs or texts marked on traffic signboards. For example, the traffic sign may include various designs or texts marked on the road surface.

The processor 570 may detect information in an image of the exterior of the vehicle 1 generated by the camera 161.

The information may be information about the travel situation of the vehicle. For example, the information may include information on the road on which the vehicle travels, traffic law information, nearby vehicle information, vehicle or pedestrian traffic light information, construction information, traffic situation information, parking lot information, and lane information.

The processor 570 may detect traffic information from at least one of the traffic light, traffic signboards and road surface included in an exterior image acquired by the camera 161. For example, the processor 570 may detect a Go or Stop signal for vehicles or pedestrians from the traffic light included in the image. For example, the processor 570 may detect various kinds of designs or texts on a traffic signboard included in the image. For example, the processor 570 may detect various kinds of designs or texts on a road surface included in the image.

The processor 570 may compare the detected information with the information stored in the memory 540 to identify the information.

For example, the processor 570 detects a design or text indicating a ramp from an object included in an acquired image. Herein, the object may be a traffic signboard or a road surface. The processor 570 may compare the traffic information stored in the memory with the detected design or text, thereby recognizing the ramp information.

For example, the processor 570 detects a design or text indicating a stop sign for vehicles or pedestrians from an object included in the acquired image. Herein, the object may be a traffic signboard or a road surface. The processor 570 may recognize the stop information by comparing the traffic information stored in the memory 540 with the detected design or text. Alternatively, the processor 570 detects a stop line on a road surface included in the acquired image. The processor 570 may recognize the stop information by comparing the traffic information stored in the memory 540 with the stop line.

For example, the processor 570 may detect presence or absence of a lane from an object included in the acquired image. Herein, the object may be a road surface. The processor 570 may check the color of the detected lane. The processor 570 may check whether the detected lane is a through lane or a turn lane.

For example, the processor 570 may detect Go or Stop information for vehicles from an object included in the acquired image. Herein, the object may be a traffic light for vehicles. Herein, the Go information may be a signal indicating straight, left turn, or right turn of the vehicle. The Stop information for the vehicles may be a signal indicating that the vehicle must stop. The Go information for the vehicles may be indicated in green and the Stop information for the vehicles may be indicated in red.

For example, the processor 570 may detect Go or Stop information for pedestrians from an object included in the acquired image. Herein, the object may be a traffic light for pedestrians. Herein, the Go information for the pedestrians may be a signal indicating that the pedestrians can cross the street at the crosswalk. Herein, the Stop information for the pedestrians may be a signal indicating that the pedestrians must stop at the crosswalk.

In addition, the processor 570 may control zoom functions of the cameras 161 and 550. For example, the processor 570 may control the zoom of the cameras 161 and 550 according to a result of the object detection. For example, if a traffic signboard is detected, but the details marked on the traffic signboard are not detected, the processor 570 may control the camera 161 such that the camera 161 zooms in. As another example, if the size of the face of a passenger contained in the images of the interior of the vehicle 1 is less than a threshold, the processor 570 may control the camera 550 to zoom in.

The processor 570 may receive weather information and traffic situation information (e.g., TPEG (Transport Protocol Expert Group)) through the communication unit 520.

The processor 570 may recognize, in real time, information about a traffic situation around the vehicle recognized by the driver assistance system 500 based on stereo images.

The processor 570 may receive navigation information from an AVN apparatus or a separate navigation apparatus through the interface unit 530.

The processor 570 may receive sensor information from the controller 170 or the sensing unit 160 through the interface unit 530. Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and steering wheel rotation information.

The processor 570 may receive navigation information from the controller 170, the AVN apparatus, or a separate navigation apparatus 200 through the interface unit 530.

In addition, the processor 570 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for performing other functions.

The processor 570 may be controlled by the controller 170.

The display unit 580 may display various kinds of information processed by the processor 570. The display unit 580 may display an image related to operation of the driver assistance system 500. To display such image, the display unit 580 may include at least one of a cluster, an HUD and a transparent display on the inner front of the vehicle. According to one embodiment, if the display unit 580 includes an HUD, the display unit 580 may include a projection module for projecting an image onto the windshield 11 of the vehicle 1. According to one embodiment, the display unit 580 may include a transparent display disposed on or in the windshield 11 of the vehicle 1. Thereby, the user can check various kinds of information through the HUD or transparent display while looking ahead.

The power supply 590 may be controlled by the processor 570 to supply electric power necessary for operation of respective constituents. In particular, the power supply 590 may receive power from, for example, a battery in the vehicle 1.

Figure 6:
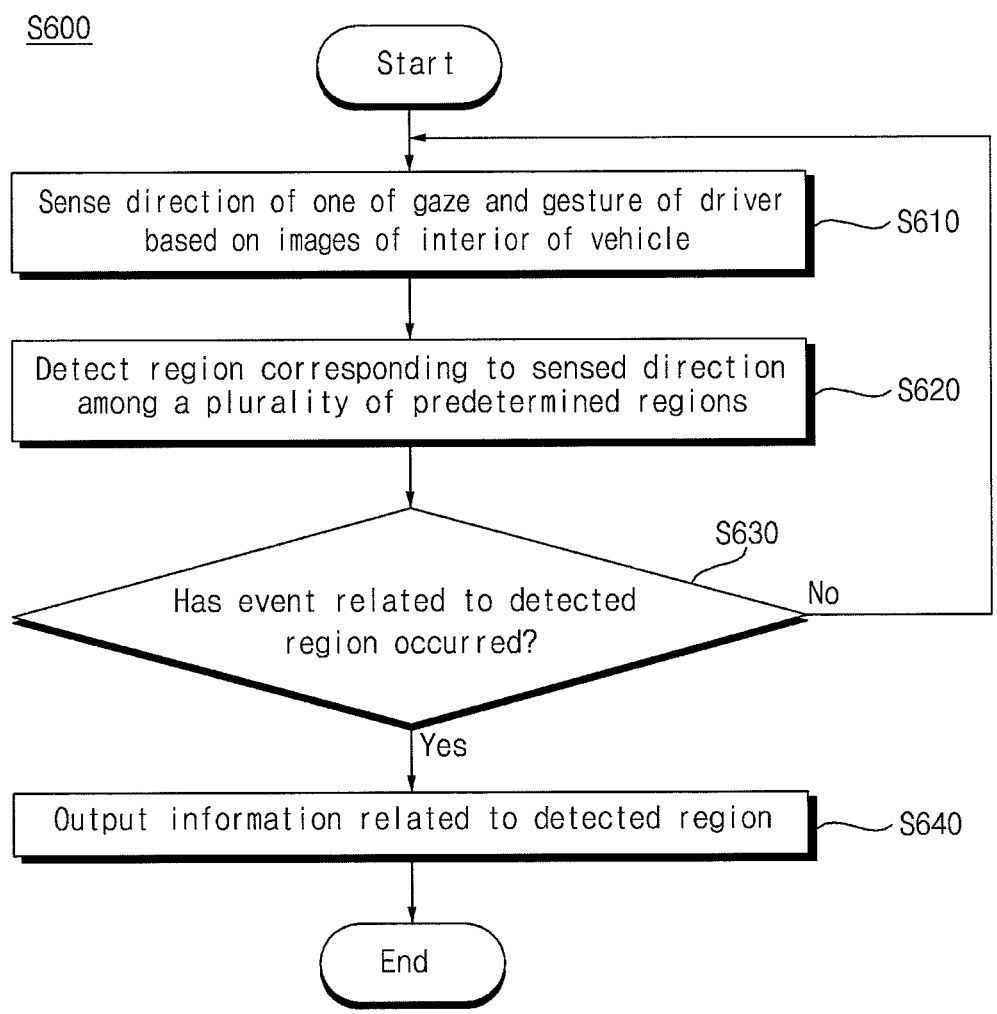
FIG. 6 is a flowchart illustrating a process performed by the driver assistance apparatus shown in FIG. 5 according to an embodiment of the present invention.

FIG. 6 is a flowchart illustrating a process S600 performed by the driver assistance apparatus 500 shown in FIG. 5.

While the process S600 is illustrated as including a plurality of sequential steps, the steps may be performed in an order different from the order shown in FIG. 6. For example, one step may be performed in parallel with another step. The process S600 may further include an additional step.

In step S610, the driver assistance apparatus 500 may sense the direction of at least one of the gaze and gesture of the driver based on images of the interior of the vehicle 1. For example, when the vehicle 1 is started, the driver assistance apparatus 500 may be connected to the vehicle 1 to perform step 610.

Specifically, the driver assistance apparatus 500 may be connected to the vehicle 1 using short-range communication standard such as Bluetooth, a wireless Internet standard such as Wi-Fi, and the external device interface standard such as Universal Serial Bus (USB). Thereby, at least one piece of information processed, modified, generated, or stored by the vehicle 1 may be shared between the vehicle 1 and the driver assistance apparatus 500.

Images of the interior of the vehicle 1 may be provided from the camera 550 of the driver assistance apparatus 500. Thus, the camera 550 may be disposed at a position in the vehicle 1 to capture an image of at least one part of the interior of the vehicle 1. For example, the camera 550 may be disposed near the driver's seat facing the driver's seat, such that the camera 550 can capture an image of at least one part of the body of the driver.

According to one embodiment, two or more cameras 550 may be provided. In this instance, the two or more cameras 550 may be disposed at different positions in the vehicle 1. For example, one camera may be disposed near the driver's seat to capture an image of the driver, and another camera may be disposed near the back seat to capture an image of a passenger.

The cameras 550 may generate three-dimensional images by capturing images of a predetermined area in the vehicle 1. Thus, the cameras 550 may include a depth camera. The depth camera may build a three-dimensional reference map for the indoor space of the vehicle 1 based on, for example, time of flight (TOF).

The processor 570 may sense the direction of at least one of the gaze and gesture of the driver based on the images provided from the cameras 550. The sensed direction may be expressed as one three-dimensional direction. The sensed direction may be expressed as, for example, three angles ($\theta x$, $\theta y$, $\theta z$) with respect to x axis, y axis and z axis. The gaze of the driver may be directed anywhere in the vehicle 1. In addition, the driver may make various gestures by moving the face, hands, fingers, arms, and shoulder. Thus, the memory 550 may store a plurality of reference patterns corresponding to the various gestures. According to one embodiment, the processor 570 may detect pupils of the driver included in respective images provided in time series, and recognize change in size and position of the pupils of the driver in time, thereby sensing the gaze direction. According to one embodiment, the processor 570 may detect the gesture of the driver using background subtraction and sense the direction of the detected gesture. Specifically, the processor 570 may compare a three-dimensional image provided from the camera 550 in real time with a three-dimensional reference image pre-stored in the memory 540. Thereby, the processor 570 may detect a part (e.g., pixels) of the image that differs from the corresponding pat of the reference image by a value greater than or equal to a threshold. Then, the processor 570 may compare the detected part with the aforementioned reference patterns, thereby determining the gesture the driver makes and the direction in which the driver makes the gesture. For example, the processor 570 may detect the direction in which the face of the driver faces based on the size and shape of the face appearing in the image provided from the camera 550.

The processor 570 may also sense the gaze and/or gesture of the driver and the direction thereof using a well-known technique different from the aforementioned technique. In addition, it is apparent to those skilled in the art that the processor 570 can sense not only the gaze and gesture of the driver but also the gaze and gesture of a passenger individually based on the images of the interior of the vehicle 1.

In step S620, the processor 570 of the driver assistance apparatus 500 may detect a region corresponding to the direction of one of the gaze and gesture of the driver among a plurality of predetermined regions of the vehicle 1. The plurality of predetermined regions may be included in the vehicle 1. For example, each of the predetermined regions may be one of the left side-view mirror, right side-view mirror, rearview mirror, dashboard, windshield, center fascia, center console, roof, driver's seat, passenger seat of the vehicle 1.

The predetermined regions may be expressed as, for example, a set of coordinates matching a plurality of directions in a one-to-one manner. In addition, the predetermined regions may be defined as not overlapping each other. Thereby, the direction of the gaze and gesture of the driver at a certain time may correspond to only one of the predetermined regions.

If none of the predetermined regions corresponds to the direction of one of the gaze and gesture of the driver, the processor 570 may terminate the process S600 or return to step S610.

In step S630, the processor 570 of the driver assistance apparatus 500 may determine whether an event related to the region detected in step S630 has occurred among a plurality of predetermined events. The memory 540 stores data defining a relationship between the predetermined regions and the predetermined events. In this instance, the predetermined events may be related to the condition of the vehicle 1, and passengers of the vehicle 1 and/or the surrounding environment of the vehicle 1. The driver assistance apparatus 500 may be connected to the vehicle 1 to receive, from the vehicle 1, information about the condition of the vehicle 1, passengers of the vehicle 1 and/or the surrounding environment of the vehicle 1. Thereby, the driver assistance apparatus 500 may determine whether an event related to the region detected in step S630 has occurred among the plurality of predetermined events.

Specifically, each of the predetermined regions may be related to at least one of the predetermined events. For example, one of the predetermined regions may be related to only one of the predetermined events. As another example, another one of the predetermined regions may be related to two or more of the predetermined events. As another example, one of the predetermined events may be related to two or more of the predetermined regions.

The relationship between the plurality of predetermined regions and the plurality of predetermined events may be defined by the user (e.g., the driver). Thus, the processor 570 may control the display unit 580 to provide the driver with a user interface for receiving the relationship between the plurality of predetermined regions and the plurality of plurality predetermined events.

The relationship between the plurality of predetermined regions and the plurality of predetermined events may be differently defined by respective users. Thereby, the driver assistance apparatus 500 may identify a user through various authentication methods (e.g., facial recognition, passcode, fingerprint recognition), and select a relationship corresponding to the identified user.

If the processor 570 determines that the event related to the detected region has occurred, the processor 570 performs step S640. If the processor 570 determines that the event related to the detected region has occurred, the process S600 may be terminated or the processor 570 may return to step S610.

In step S640, the driver assistance apparatus 500 outputs information related to the detected region among a plurality of predetermined regions. The memory 540 stores data defining a relationship between the plurality of predetermined regions and a plurality of predetermined pieces of information. In this instance, the predetermined pieces of information may include images of the interior and/or exterior of the vehicle 1. In addition, the predetermined pieces of information may further include additional information related to images of the interior and/or exterior of the vehicle 1. The driver assistance apparatus 500 may be connected to the vehicle 1 to receive exterior images of the vehicle 1 provided by the camera 161 from the vehicle 1. Thereby, when an event corresponding to the detected region occurs, the driver assistance apparatus 500 may output some images related to the detected region among the exterior images.

Figure 7A:
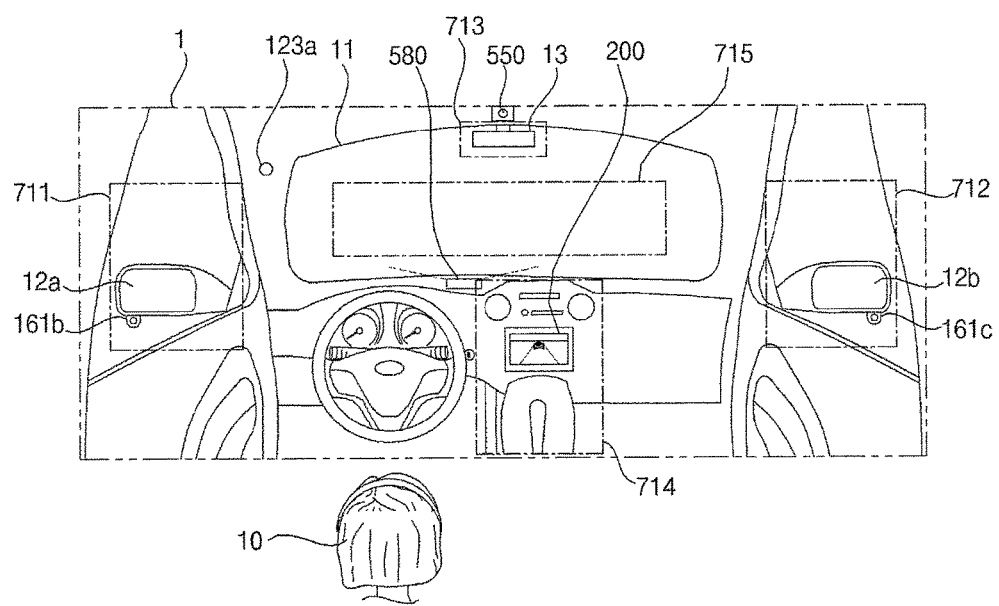
FIG. 7A shows an indoor view of the vehicle including a plurality of predetermined regions according to an embodiment of the present invention.

FIG. 7A shows an indoor view of the vehicle 1 including a plurality of predetermined regions according to an embodiment of the present invention. FIG. 7B shows an image acquired by the camera 550 of the driver assistance apparatus 500 according to an embodiment of the present invention. FIG. 7C shows an data structure defining a relationship among a plurality of predetermined regions, a plurality of predetermined events and a plurality of predetermined pieces of information.

The indoor space of the vehicle shown in FIG. 7A may be identical or very similar to the field of vision of the driver 10. As shown in FIG. 7A, the indoor space of the vehicle 1 may be partitioned into a plurality of regions 711, 712, 713, 714 and 715.

A first region 711 may correspond to the left side-view mirror 12*a*. For example, the first region 711 may be a region including the left side-view mirror 12*a* with respect to the field of vision of the driver 10.

The second region 712 may correspond to the right side-view mirror 12*b*. For example, the second region 712 may be a region including the right side-view mirror 12*b* with respect to the field of vision of the driver 10.

A third region 713 may correspond to the rearview mirror 13. For example, the third region 713 may be a region including the rearview mirror 13 with respect to the field of vision of the driver 10.

A fourth region 714 may correspond to the center fascia or center consol. The center fascia may be a part of the vehicle 1 where a control panel for a stereo, an air conditioner, a heater and the like is positioned. In addition, as shown in the figure, the center fascia may be positioned between the driver's seat and the front passenger seat. For example, the forth region 714 may be a region including at least one part of the center fascia with respect to the field of vision of the driver 10.

A fifth region 715 may correspond to the windshield 11. For example, the fifth region 715 may be a region including at least one part of the windshield 11 with respect to the field of vision of the driver 10.

The first to fifth regions 711, 712, 713, 714 and 715 may not overlap each other as shown in the figure. In addition, the first to fifth regions 711, 712, 713, 714 and 715 may be spaced a predetermined distance from each other. Thereby, only one region corresponding to the direction of gaze and gesture of the driver 10 may be easily determined by the processor 570.

The camera 550 of the driver assistance apparatus 500 may be disposed at the upper end of the windshield 11 as shown in the figure. However, this is simply illustrative, and the camera 550 may be disposed anywhere the camera 550 can capture an image of the driver 10. Referring to FIG. 7B, an image 720 acquired by the camera 550 may include a part of the body of the driver 10 seated on the driver's seat. For example, the image 720 may show the face 211, eyes 212*a* and 212*b*, hand 13, arm 14 and chest 15 of the driver 10.

The camera 550 may provide the processor 570 with the image 720 including the body of the driver 10, and the processor 570 may sense the direction of the gaze or gesture of the driver 10, based on the image 720 including the driver 10.

At a certain time, the gaze or gesture of the driver 10 may be directed to one of the regions 711, 712, 713, 714 and 715. Thereby, the processor 570 may determine, in real time or periodically, one of the regions 711, 712, 713, 714 and 715 at which the driver 10 gazes and/or to which the driver 10 points. If the driver again gazes at or points to a region which is not included in the plurality of predetermined regions, the processor 570 may not make any response.

In FIG. 7A, the number of predetermined regions is five. However, this is simply illustrative, and more or fewer than the illustrated number of regions may be predetermined regions. In addition, while the boundaries of the regions 711, 712, 713, 714 and 715 are illustrated as forming quadrangles, embodiments of the present invention are not limited thereto. The boundaries may be predetermined to form another shape.

Next, referring to FIG. 7C, a data structure storage 730 in the memory 540 may be checked. As shown in FIG. 7C, the data structure 730 includes a relationship among a plurality of predetermined regions, a plurality of predetermined events and a plurality of predetermined pieces of information.

Specifically, at least one event related to a specific region of the predetermined region is related to at least one of the predetermined pieces of information.

For example, as shown in the figure, when an event of turning on the left turn signal lamp occurs, the region corresponding to the left side-view mirror 12*a* may be related to a left image. If the driver 10 looks in the left side-view mirror 12*a* with the left turn signal lamp turned on, the processor 570 may output at least one part of the left images provided from the camera 161*b* to the display unit 580.

In another example, as shown in the figure, when either an event of another vehicle approaching the rear of the vehicle 1 within a predetermined distance or an event of the sound of a horn being made to the rear of the vehicle 1 occurs, the region corresponding to the rearview mirror 13 may be related to a rearview image. If the driver 10 looks in the rearview mirror 13 while another vehicle approaches the vehicle 1 from behind within a predetermined distance or the sound of a horn is made behind the vehicle 1, the processor 570 may output at least part of the rearview image provided from the camera 161*d* (see FIG. 3) to the display unit 580.

In another example, as shown in the figure, if an event occurs in which the vehicle 1 is approaching a pre-registered object of interest (e.g., crosswalk, position of a past accident, destination, facility) within a predetermined distance, the region corresponding to the center fascia may be related to the route guide information. If the current location of the vehicle 1 is within a predetermined distance from the pre-registered object of interest, but neither the gaze nor gesture of the driver 10 points to the region corresponding to the center fascia, the route guide information may not be displayed on the display unit 580.

Figure 8:
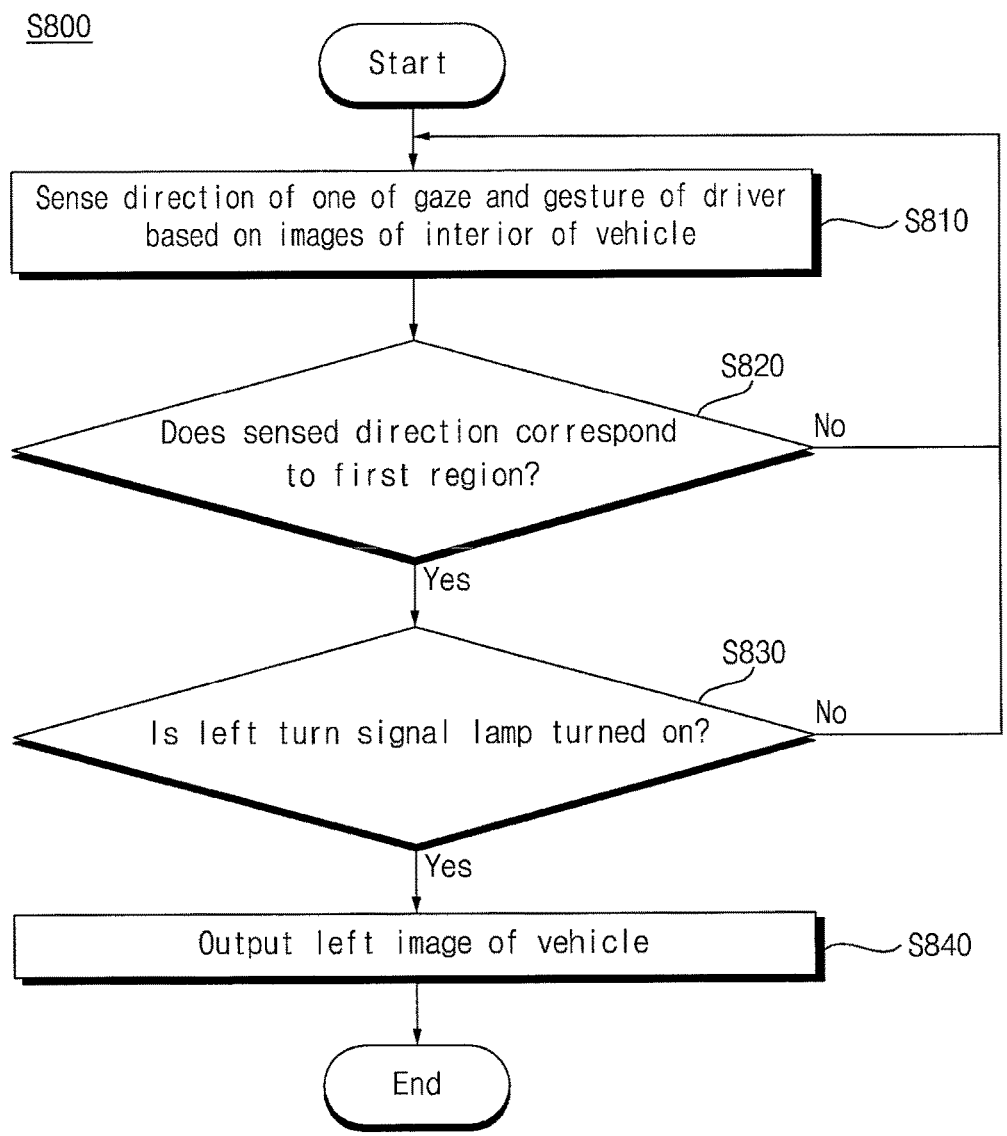
FIG. 8 shows a flowchart illustrating an process performed by the driver assistance apparatus according to an embodiment of the present invention.
Figure 9A:
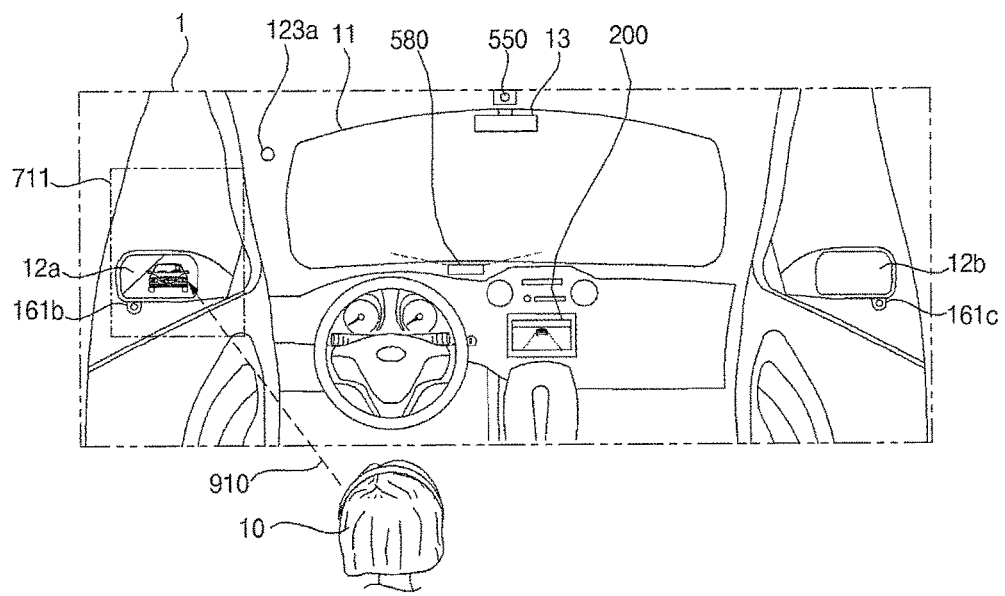
FIGS. 9A to 9C are views provided to aid in understanding the process illustrated in FIG. 8 according to an embodiment of the present invention.
Figure 9B:
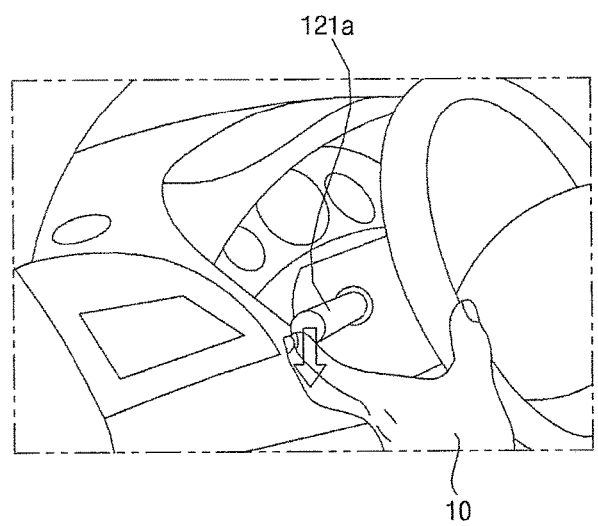
Figure 9C:
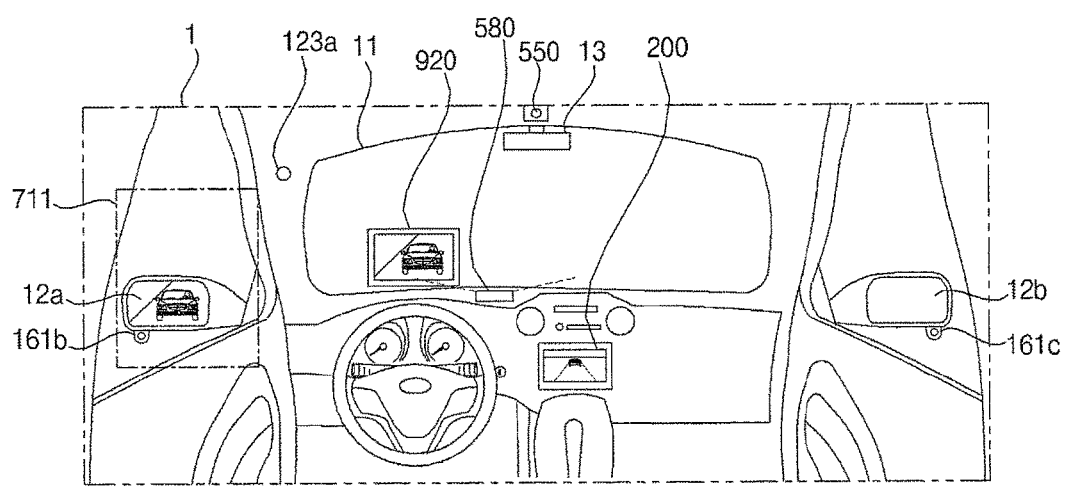

FIG. 8 is a flowchart illustrating an process S800 performed by the driver assistance apparatus according to an embodiment of the present invention. FIGS. 9A to 9C are views provided to aid in understanding the process illustrated in FIG. 8.

In step S810, the processor 570 may sense the direction of one of the gaze and gesture of the driver 10, based on the images of the interior of the vehicle 1. The camera 550 may provide the processor 570 with the images in the order in which the images are captured. Alternatively, the camera 550 may provide the processor 570 with each image along with the time at which the image was captured.

In step S820, the processor 570 determines whether the direction sensed in step S810 corresponds to the first region 711. Herein, the first region 711 may be a region including the left side-view mirror 12a shown in FIG. 7A. If neither the gaze nor gesture of the driver 10 corresponds to the first region 711, the processor 570 may return to step S810 or the process S800 may be terminated.

Further, if it is determined that the sensed direction corresponds to the first region 711, the processor 570 performs step S830. For example, as shown in FIG. 9A, if the gaze 910 of the driver 10 points to the inside of the first region 711, step S830 may be performed.

The driver 10 may look in the left side-view mirror 12a during driving. This may be a preliminary behavior for changing to the left lane or left turn.

In step S830, the processor 570 determines whether the left turn signal lamp has been turned on. For example, the processor 570 may determine whether the left turn signal lamp has been turned on by pulling down the turn signal lever 121a within a predetermined range of time before and after the direction sensed through step S820 was determined to correspond to the first region 711, as shown in FIG. 9b. If it is determined that the left turn signal lamp has not been turned on, the processor 570 may return to step S810 or the process S800 may be terminated.

In step S840, the driver assistance apparatus 500 outputs a left view image of the vehicle 1. Specifically, the processor 570 receives the left view image of the vehicle 1 from the left camera 161b disposed at the exterior of the vehicle 1. The left view image generated by the left camera 161b may include a part corresponding to the left view shown on the left side-view mirror 12a.

In addition, the processor 570 may control the display unit 580 to output at least one part of the left view image provided from the left camera 161b to a preset region within the windshield 11. Thus, the processor 570 may extract, enlarge, scale down or change a part of the left-view image provided from the left camera 161b.

For example, as shown in FIG. 9C, the processor 570 may control the display unit 580 to output an image 920 identical to the left side view shown on the left side-view mirror 12a. Herein, the processor 570 may control the display unit 580 to display a frame having the same shape as that of the left side-view mirror 12a at the edge of the image 920. Thereby, the driver 10 may intuitively recognize that the image 920 displayed on the windshield 11 corresponds to the left side-view mirror 12a. In addition, the driver 10 may check the situation on the left side of the vehicle 1 through the image 920 in real time and safely perform left turn, U-turn or lane change while looking ahead.

In addition, the vehicle 1 connected to the driver assistance apparatus 500 may output a sound signal announcing that the left side view image is displayed on the display unit 580. For example, if the driver assistance apparatus 500 is displaying the left side view image on the windshield 11, the vehicle 1 may control the sound unit 142 to output a beep sound.

In addition, when the direction of the gaze or gesture of the driver 10 corresponds to the first region 711, the driver assistance apparatus 500 may activate the lane change assistance function of the vehicle 1 in response to occurrence of an event of turning on the left turn signal lamp. Once the lane change assistance function is activated, the vehicle 1 outputs a warning signal related to the blind spot and/or an obstacle to help the driver 10 perform safe lane change.

The image 920 output to the windshield 11 may disappear from the windshield 11 according to a predetermined condition in response to turning-on of the left turn signal lamp. For example, when a predetermined time passes after the time at which the left turn signal lamp is deactivated, left turn is completed, U-turn is completed, or lane change is completed, the processor 570 may control the display unit 580 not to output the image 920 anymore. In addition, the size of the image 920 may gradually decrease as time passes after the image 920 was output for the first time.

Figure 10:
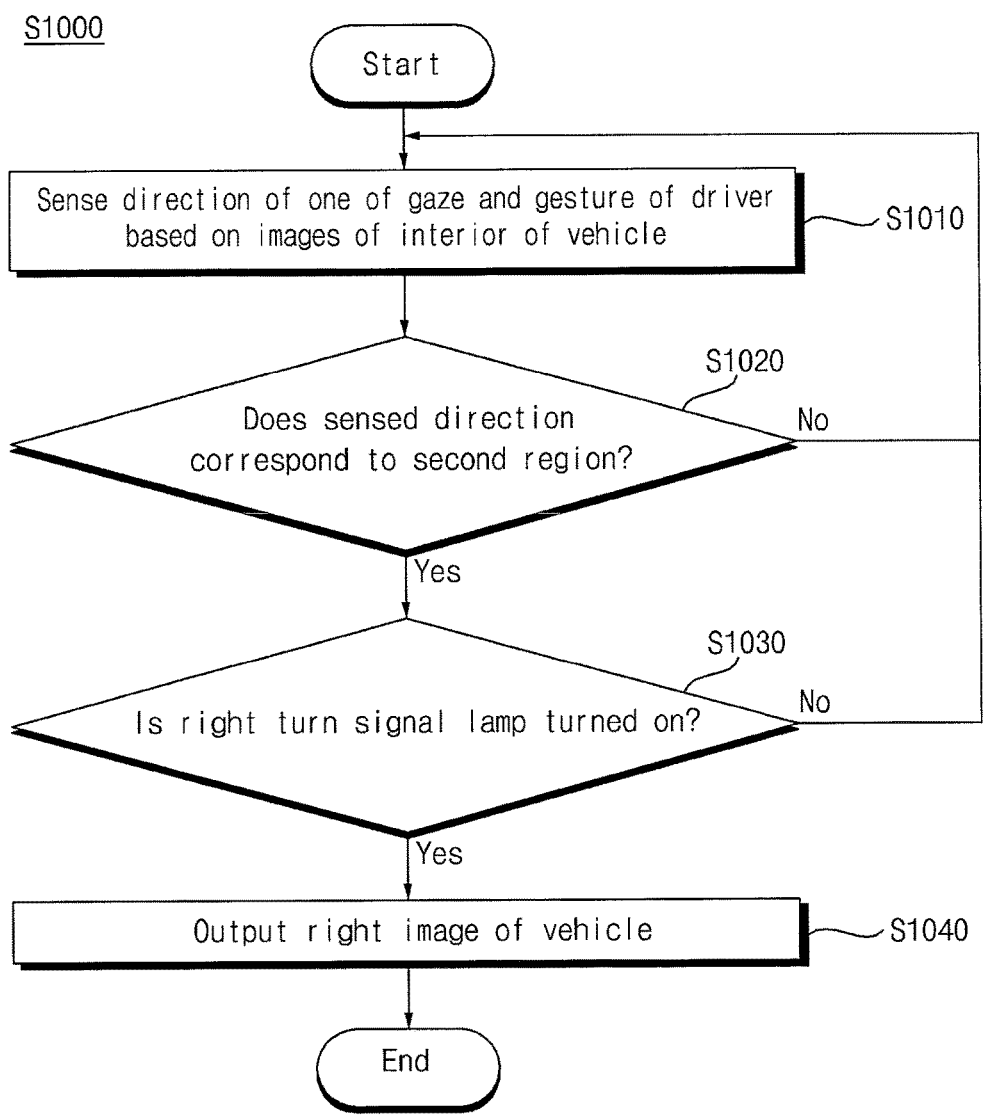
FIG. 10 is a flowchart illustrating an process performed by a driver assistance apparatus according to an embodiment of the present invention.
Figure 11A:
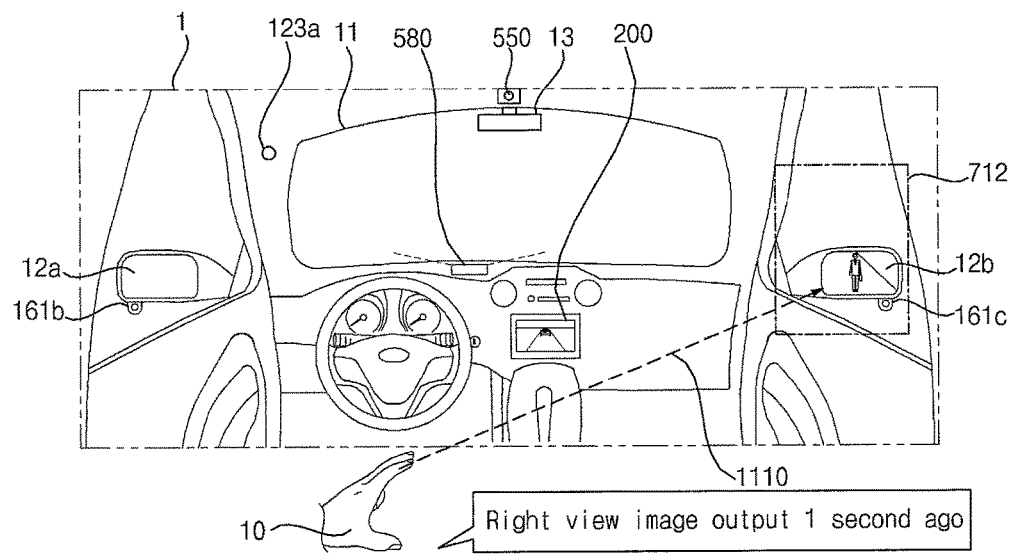
FIGS. 11A to 11C are views provided to aid in understanding the process illustrated in FIG. 10 according to an embodiment of the present invention.
Figure 11B:
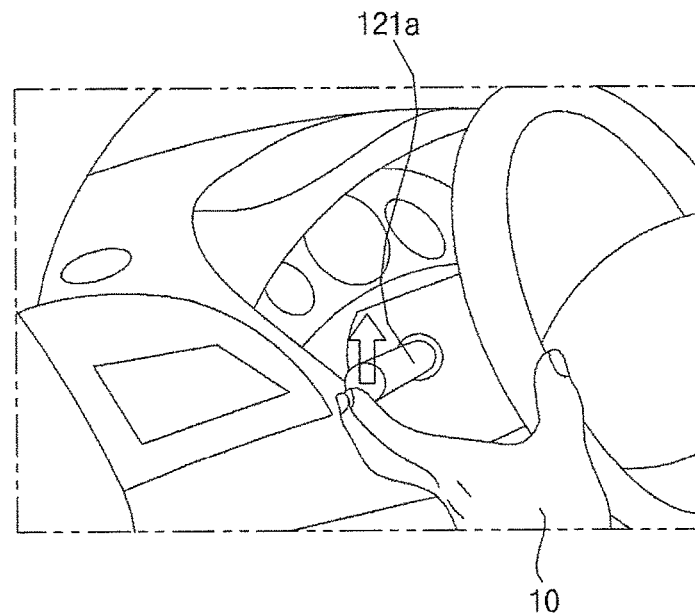
Figure 11C:
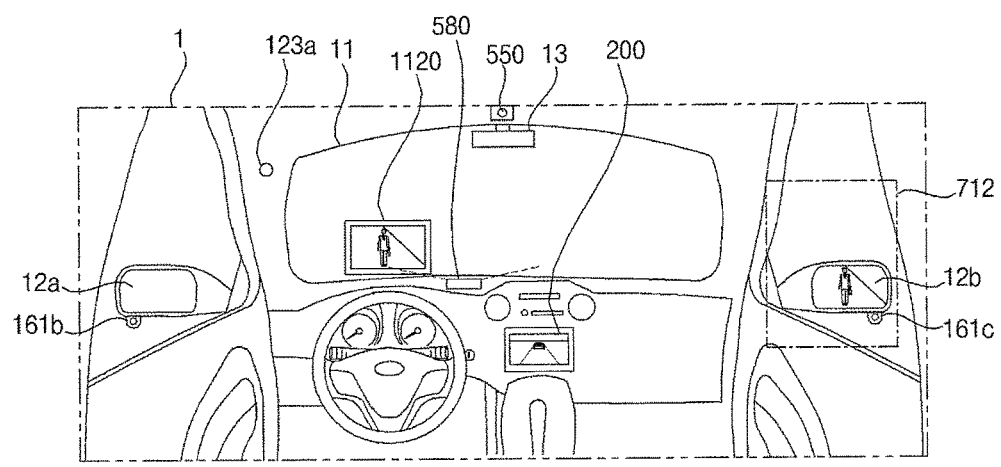

FIG. 10 is a flowchart illustrating an process S1000 performed by the driver assistance apparatus 500 according to an embodiment of the present invention. FIGS. 11A to 11C are views provided to aid in understanding the process S1000 illustrated in FIG. 10.

In step S1010, the processor 570 may sense the direction of one of the gaze and gesture of the driver 10 based on the images of the interior of the vehicle 1. The camera 550 may provide images to the processor 570 in the order in which the images are captured. Alternatively, the camera 550 may provide the processor 570 with each image along with the time at which the image was captured.

In step S1020, the processor 570 determines whether the direction sensed in step S1010 corresponds to the second region 712. Herein, the second region 712 may be a region including the right side-view mirror 12b shown in FIG. 7A. If neither the gaze nor gesture of the driver 10 corresponds to the second region 712, the processor 570 may return to step S1010 or the process S1000 may be terminated.

Further, if it is determined that the sensed direction corresponds to the second region 712, the processor 570 performs step S1030. For example, as shown in FIG. 11A, if the direction 1110 in which the gesture of the driver 10 points corresponds to the inside of the second region 712, step S1030 may be performed.

The driver 10 may look in the right side-view mirror 12b while driving. This may be a preliminary behavior for changing to the right lane or right turn.

In step S1030, the processor 570 determines whether the right turn signal lamp has been turned on. For example, the processor 570 may determine whether the right turn signal lamp has been turned on by pushing up the turn signal lever 121a within a predetermined time before or after the time at which the direction sensed through step S1020 is determined to correspond to the second region 712, as shown in FIG. 11B. If it is determined that the right turn signal lamp has not been turned on, the processor 570 may return to step S1010 or the process S1000 may be terminated.

In step S1040, the driver assistance apparatus 500 outputs a right view image of the vehicle 1. Specifically, the processor 570 receives the right view image of the vehicle 1 from the right camera 161c disposed at the exterior of the vehicle 1. The right view image generated by the right camera 161c may include a part corresponding to the right side view shown on the right side-view mirror 12b.

In addition, the processor 570 may control the display unit 580 to output at least one part of the right-view image provided from the right camera 161c to a preset region within the windshield 11. Thus, the processor 570 may extract, enlarge, scale down or change a part of the right view image provided from the right camera 161c.

For example, as shown in FIG. 11C, the processor 570 may control the display unit 580 to output an image 1120 identical to the right side view shown on the right side-view mirror 12b. Herein, the processor 570 may control the display unit 580 to display a frame having the same shape as that of the right side-view mirror 12b at the edge of the image 1120. Thereby, the driver 10 may intuitively recognize that the image 1120 displayed on the windshield 11 corresponds to the right side-view mirror 12b. In addition, the driver 10 may check the situation on the right side of the vehicle 1 through the image 1120 in real time and safely perform right turn or lane change while looking ahead.

In addition, the vehicle 1 connected to the driver assistance apparatus 500 may output a sound signal announcing that the right view image is displayed on the display unit 580. For example, if the driver assistance apparatus 500 is displaying the right view image on the windshield 11, the vehicle 1 may control the sound unit 142 to output a beep sound.

In addition, when the direction of the gaze or gesture of the driver 10 corresponds to the second region 712, the driver assistance apparatus 500 may activate the lane change assistance function of the vehicle 1 in response to occurrence of an event of turning on the right turn signal lamp. Once the lane change assistance function is activated, the vehicle 1 outputs a warning signal related to the blind spot and/or an obstacle to help the driver 10 perform safe lane change.

The image 1120 output to the windshield 11 may disappear from the windshield 11 according to a predetermined condition in response to turning-on of the right turn signal lamp. For example, a predetermined time passes after the time at which the right turn signal lamp is deactivated, right turn is completed, or lane change is completed, the processor 570 may control the display unit 580 not to output the image 1120 anymore. In addition, the size of the image 1120 may gradually decrease as time passes after the image 1120 was output for the first time.

Figure 12:
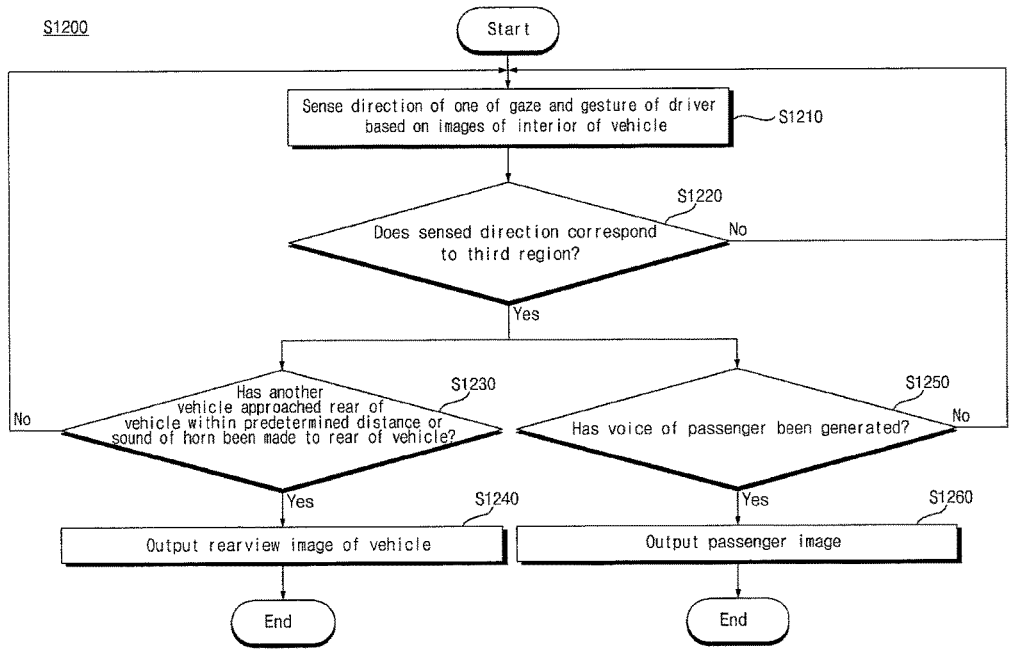
FIG. 12 is a flowchart illustrating an process performed by a driver assistance apparatus according to an embodiment of the present invention.

FIG. 12 is a flowchart illustrating an process S1200 performed by the driver assistance apparatus 500 according to an embodiment of the present invention. FIGS. 13A to 13E are views provided to aid in understanding the process S1200 illustrated in FIG. 12.

In step S1210, the processor 570 may sense the direction of at least one of the gaze and gesture of the driver 10 based on the images of the interior of the vehicle 1. The camera 550 may provide images to the processor 570 in the order in which the images are captured. Alternatively, the camera 550 may provide the processor 570 with each image along with the time at which the image was captured. In this embodiment, it is assumed that a camera 550a (see FIG. 13D) for capturing an image of the driver's seat and a camera 550b (see FIG. 13D) for capturing an image of the back seat are disposed in the vehicle 1.

In step S1220, the processor 570 determines whether the direction sensed in step S1210 corresponds to the third region 713. Herein, the third region 713 may be a region including the rearview mirror 13 shown in FIG. 7A. If neither the gaze nor gesture of the driver 10 corresponds to the third region 713, the processor 570 may return to step S1210 or the process S1200 may be terminated.

Figure 13A:
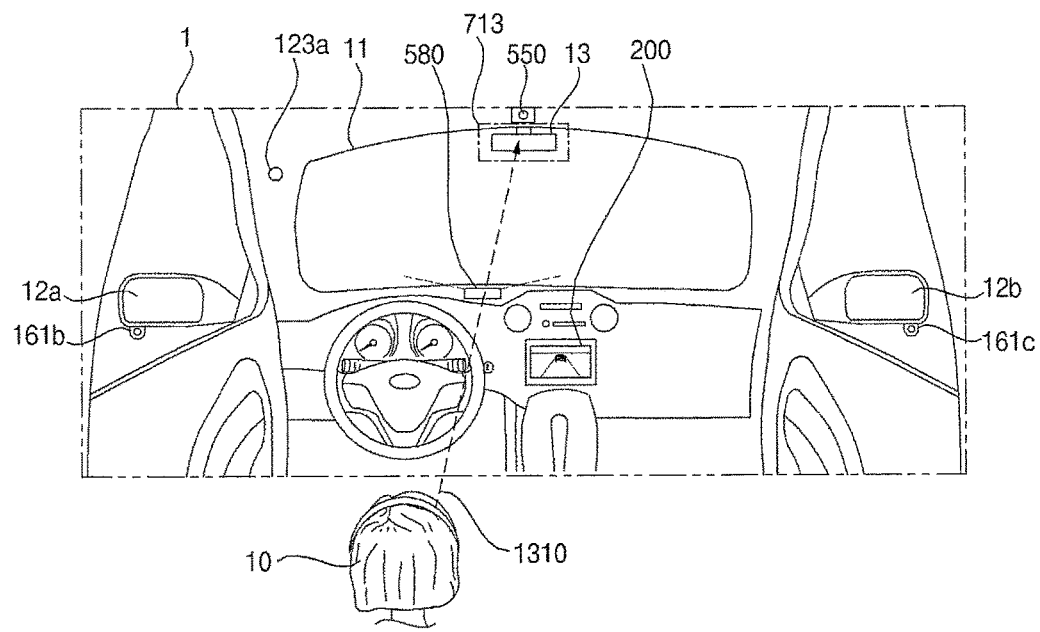
FIGS. 13A to 13E are views provided to aid in understanding the process illustrated in FIG. 12 according to an embodiment of the present invention.

Further, if it is determined that the sensed direction corresponds to the third region 713, the processor 570 performs at least one of steps S1230 and S1240. For example, as shown in FIG. 13A, if the gaze 1310 of the driver 10 is directed to the inside of the third region 713, at least one of steps S1230 and S1250 may be performed. Alternatively, if the finger of the driver 10 points to the inside of the third region 713, at least one of steps S1230 and S1250 may be performed.

The driver 10 may look in the rearview mirror 13 while driving. This may be a behavior for checking a passenger positioned on the back seat or the traffic situation behind the vehicle 1.

Figure 13B:
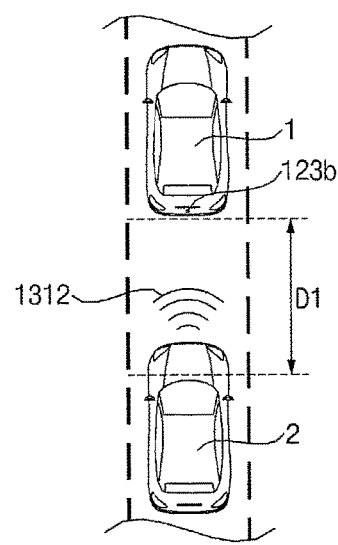

In step S1230, the processor 570 determines whether another vehicle has approached the back of the vehicle 1 within a predetermined distance or a horn sound has been made behind the vehicle 1 as an event related to the third region 713. For example, the processor 570 may determine whether another vehicle 2 is positioned within a predetermined distance D1 from the back of the vehicle 1 as shown in FIG. 13B, based on obstacle information (e.g., the type of an obstacle, the number of obstacles, a distance to an obstacle) provided from at least one of the ultrasonic sensor, radar sensor and lidar sensor provided to the vehicle 1 shown in FIG. 2. In addition, the processor 570 may determine whether the horn sound 1312 has been made by another vehicle 2 behind the vehicle 1, based on an external sound received through the microphone 123b provided to the exterior of the vehicle 1. If it is determined that the other vehicle 2 has not approached within the predetermined distance D1 from the back of the vehicle 1, and the horn sound has not been generated by the vehicle 2, the processor 570 may return to step S1210 or the process S1200 may be terminated. If it is determined that the vehicle 2 is positioned within the predetermined distance D1 from the back of the vehicle 1 or the horn sound 1312 has been made by the vehicle 2, the processor 570 may perform step S1240.

In step S1240, the driver assistance apparatus 500 outputs a rearview image 1320 of the vehicle 1. Specifically, the processor 570 receives the rearview image of the vehicle 1 from the rear camera 161d disposed on the exterior of the vehicle 1. The rearview image generated by the rear camera 161d may include a part corresponding to the rear view shown on the rearview mirror 12b.

In addition, the processor 570 may control the display unit 580 to output at least one part of the rearview image provided from the rear camera 161d to a preset region within the windshield 11. Thus, the processor 570 may extract, enlarge, scale down or change a part of the rearview image provided from the rear camera 161d.

Figure 13C:
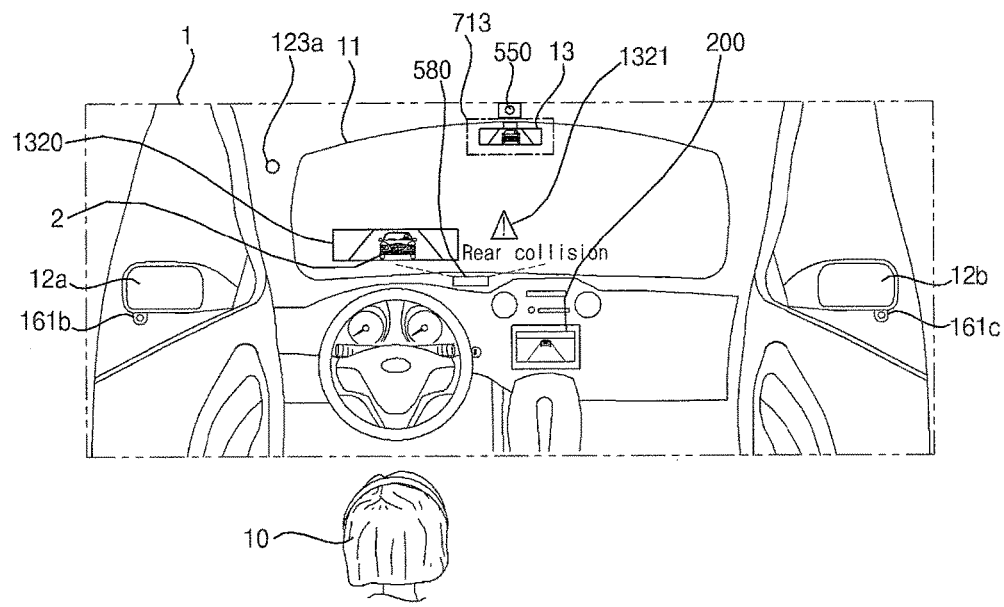

For example, as shown in FIG. 13C, the processor 570 may control the display unit 580 to output an image 1320 identical to a part corresponding to the exterior of the vehicle 1 in the rear view shown on the rearview mirror 13. Herein, the processor 570 may control the display unit 580 to display a frame having the same shape as that of the rearview mirror 13 at the edge of the image 1320. Thereby, the driver 10 may intuitively recognize that the image 1320 displayed on the windshield 11 corresponds to the rearview mirror 13. In addition, the driver 10 may check the traffic situation behind the vehicle 1 through the image 1320 in real time while looking ahead.

When the driver assistance apparatus 500 outputs the rear image the vehicle 1, the driver assistance apparatus 500 may activate the rear collision warning function of the vehicle 1. For example, in response to the event of another vehicle 2 approaching the vehicle 1 within the predetermined distance D1 from the back of the vehicle 1, the processor 570 of the driver assistance apparatus 500 may control the display unit 580 to display a warning image 1321 for announcing risk of an accident involving the vehicle 2 near the windshield 11 on which the rear image 1320 is displayed, as shown in FIG. 13C. Additionally, as the rear collision warning function is activated, the processor 570 may control the sound output unit 142 to output a warning sound for announcing the risk of collision with the vehicle 2. Thereafter, when the distance between the vehicle 2 and the vehicle 1 becomes greater than or equal to the predetermined distance D1, the processor 570 may control the display unit 580 not to display the rear image 1320 and the warning image 1321. In addition, when the distance between the vehicle 2 and the vehicle 1 becomes greater than or equal to the predetermined distance D1, the processor 570 may deactivate the rear collision warning function.

In addition, the vehicle 1 connected to the driver assistance apparatus 500 may output a sound signal for announcing that the rear image is output by the display unit 580. For example, if the driver assistance apparatus 500 is displaying the rear image on the windshield 11, the vehicle 1 may control the sound output unit 142 to output a beep sound. In addition, the processor may control the sound output unit 142 to increase the volume of the beep sound as the distance between the vehicle 2 and the vehicle 1 decreases.

In response to the event of the vehicle 2 approaching the vehicle 1 within the predetermined distance D1 from the back of the vehicle 1, the image 1320 output to the windshield 11 may disappear from the windshield 11 according to a predetermined condition. For example, if a predetermined amount of time passes from the time at which the vehicle 2 shown in FIG. 13B moves away from the vehicle 1 beyond the predetermined distance D1, the processor 570 may control the display unit 580 not to output the image 1320 anymore. In addition, the size of the image 1320 may gradually decrease as time passes after the image 1320 was output for the first time.

Figure 13D:
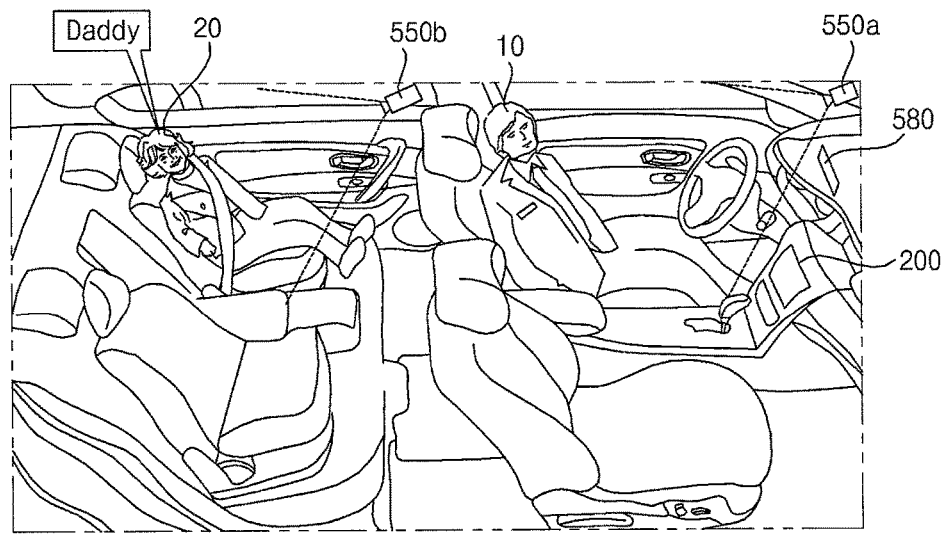
Figure 13E:
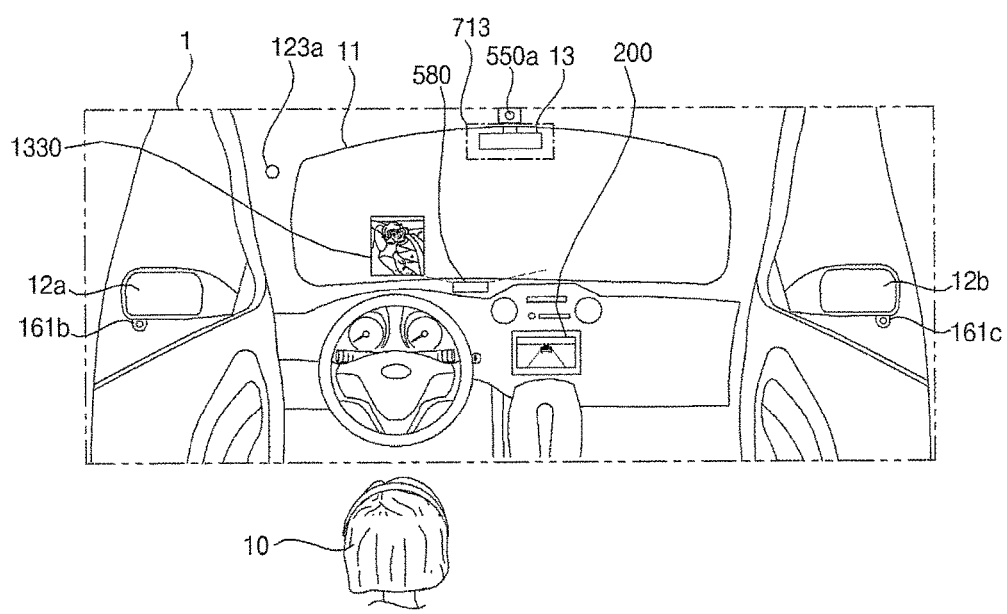

In step S1250, the processor 570 determines whether the voice of a passenger in the vehicle 1 has been uttered as an event related to the third region 713. That is, the processor 570 determines whether a vocal sound (e.g., conversation, humming, screaming, crying, laughing) is generated by the passenger. For example, as shown in FIG. 13D, the vehicle 1 may receive a sound (e.g., "daddy") generated by the passenger 20 in the vehicle 1 in addition to the driver 10, using the microphone 123a, and provide an electrical signal corresponding to the received sound to the processor 570.

In addition, the processor 570 may analyze the electrical signal provided from the microphone 123a and measure the magnitude of the vocal sound generated by the passenger 20. If the magnitude of the measured vocal sound is greater than or equal to a predetermined threshold, the processor 570 may determine that there is a vocal sound from the passenger 20. If the magnitude of the vocal sound generated by the passenger 20 is less than the threshold, the processor 570 may return to step S1210.

In step S1260, the driver assistance apparatus 500 outputs an image of the passenger 20 in the vehicle 1. Specifically, the processor 570 may receive an image containing the passenger 20 from a camera 550d disposed to capture images of the rear left. The image of the passenger 20 generated by the camera 550b may include a part corresponding to the rear view shown on the rearview mirror 13.

In addition, the processor 570 may control the display unit 580 to output at least one part of the image of the passenger provided from the camera 550b to a preset region within the windshield 11. Thus, the processor 570 may extract, enlarge, scale down or change a part containing the passenger 20 in the image provided from the camera 550b.

Thereby, the driver 10 can check the state of the passenger 20 sitting on the back seat in real time through the image 1330, while looking ahead.

Further, the image 1330 output to the windshield 11 in response to the event of the passenger 20 speaking may disappear from the windshield 11 according to a predetermined condition. For example, if the passenger 20 remains silent, the processor 570 may control the display unit 580 not to output the image 1330 anymore. In addition, the size of the image 1330 may gradually decrease as time passes from the time at which the image 1330 was first output.

Figure 14:
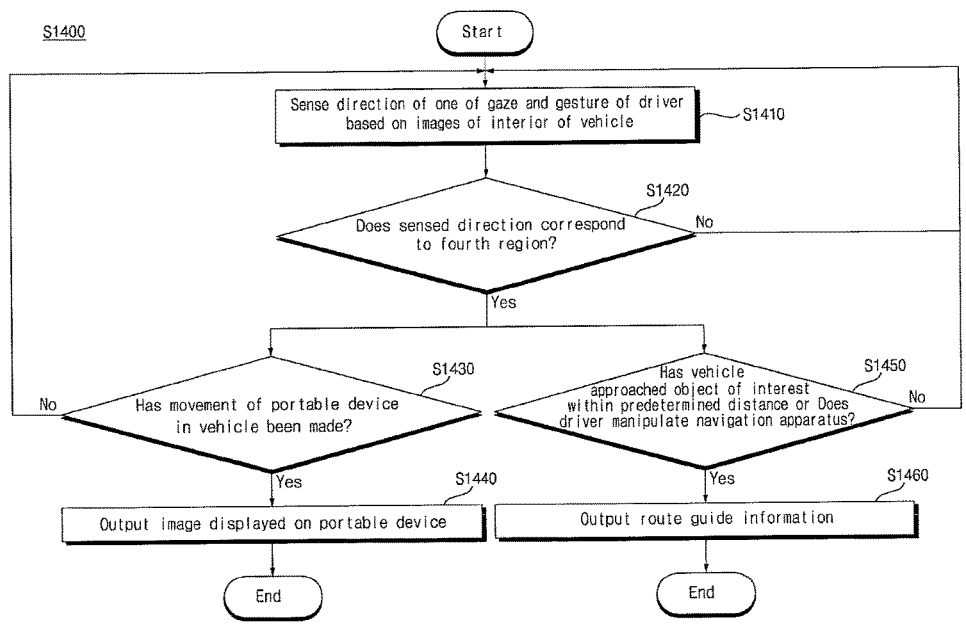
FIG. 14 is a flowchart illustrating an process performed by the driver assistance apparatus according to an embodiment of the present invention.

FIG. 14 is a flowchart illustrating an process S1400 performed by the driver assistance apparatus 500 according to an embodiment of the present invention. FIGS. 15A to 15D are views provided to aid in understanding the process S1400 illustrated in FIG. 14 according to embodiments of the present invention.

In step S1410, the processor 570 may sense the direction of one of the gaze and gesture of the driver 10 based on the images of the interior of the vehicle 1. The camera 550 may provide images to the processor 570 in the order in which the images are captured. Alternatively, the camera 550 may provide the processor 570 with each image along with the time at which the image was captured.

In step S1420, the processor 570 determines whether the direction sensed through step S1410 corresponds to the fourth region 714. Herein, the fourth region 714 may be a region including at least one part of the center fascia or console shown in FIG. 7A. The navigation apparatus 200 for displaying navigation information such as route guide information may be disposed on the center fascia. If neither the gaze nor gesture of the driver 10 corresponds to the fourth region 714, the processor 570 may return to step S1410 or the process S1400 may be terminated.

Figure 15A:
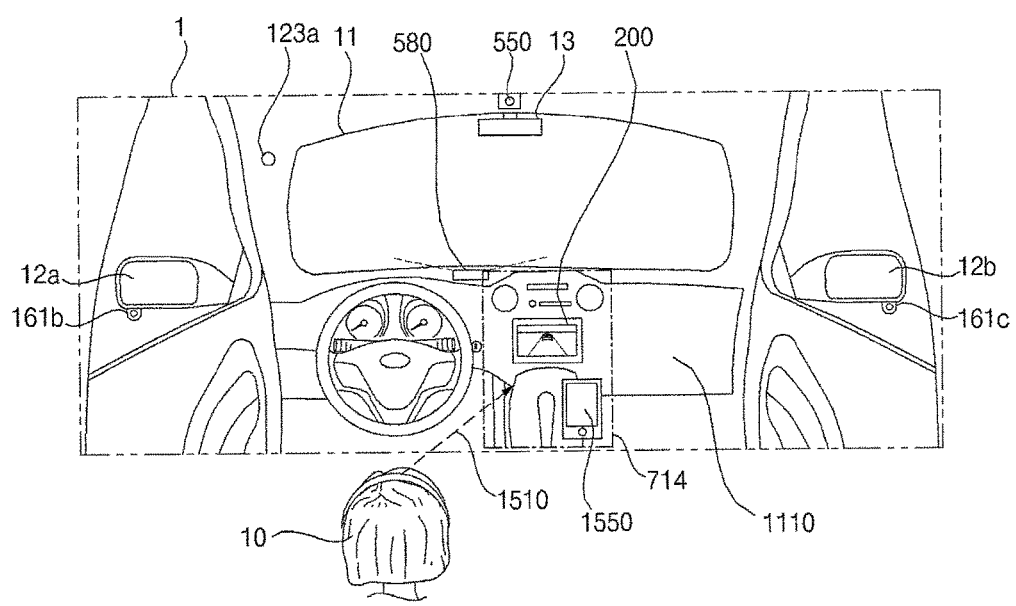
FIGS. 15A to 15D are views provided to aid in understanding the process illustrated in FIG. 14 according to an embodiment of the present invention.

Further, if it is determined that the sensed direction corresponds to the fourth region 714, the processor 570 performs at least one of steps S1430 and S1450. For example, as shown in FIG. 15A, if the gaze 1510 of the driver 10 is directed to the inside of the fourth region 714, at least one of steps S1430 and S1450 may be performed. Alternatively, if the finger of the driver 10 points to the inside of the fourth region 714, at least one of steps S1430 and S1450 may be performed.

The driver 10 may look at the fourth region 714 during driving. This may be a behavior for checking route guide information displayed on the navigation apparatus 200 of the vehicle 1 or manipulating a portable device 1550.

In step S1430, the processor 570 determines whether movement of the portable device 1550 in the vehicle 10 has been made as an event related to the fourth region 714. As described above, the portable device 1550 may be connected to the driver assistance apparatus 500 directly or via the vehicle 1 in a wired and/or wireless manner. For example, when the driver 10 manipulates the portable device 1550 while holding the portable device 1550, movement of the portable device 1550 may be sensed by a gravity sensor, an acceleration sensor, a gyro sensor and the like provided to the portable device 1550. The portable device 1550 may provide information corresponding to the movement thereof to the driver assistance apparatus 500 in real time and determine whether the portable device 1550 has been moved. If movement of the portable device 1550 is not sensed, the possessor 570 may return to step S1410, or the process S1400 may be terminated. If it is determined that the portable device 1550 has been moved, the processor 570 may perform step S1440.

In step S1440, the driver assistance apparatus 500 outputs an image that is being displayed on the portal device 1550. Specifically, the processor 570 receives the image that is being displayed on the screen of the portable device 1550, from the portable device 1550 directly or via the vehicle 1. Subsequently, the processor 570 may control the display unit 580 to output the received image to a preset region of the windshield 11. Thus, the processor 570 may extract, enlarge, scale down or change a part of the image received from the portable device 1550.

Figure 15B:
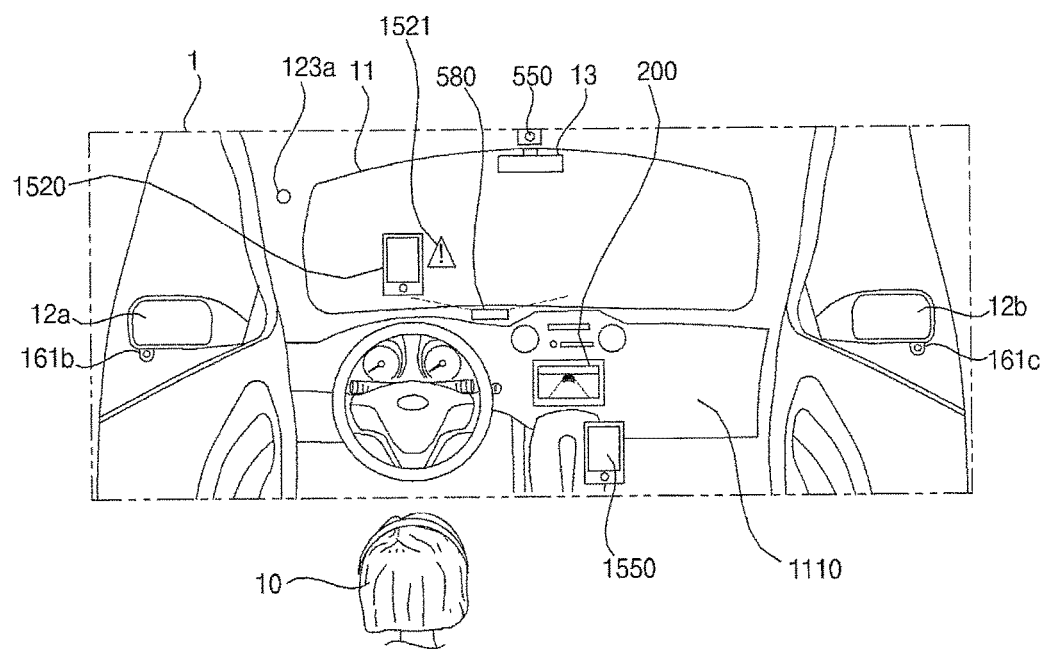

For example, as shown in FIG. 15B, the processor 517 may control the display unit 580 to output an image 1520 identical to the image displayed on the portable device 1550. Thereby, the driver 10 may check a simple message that is being displayed on the portable device 1550 through the image 1520 in real time, while looking ahead.

In addition, if the current speed of the vehicle 1 is higher than or equal to a preset reference speed (e.g., 80 km/h), the processor 570 may control the display unit 580 to output a warning image 1521. As shown in the figure, the warning image 1521 may be displayed together with the image 1520 that is being displayed on the portable device 1550. Alternatively, the warning image 1521 may be displayed alone without the image 1520 that is being displayed on the portable device 1550. Thereby, the driver 10 may keep looking forward, recognizing that checking the images displayed on the portable device 1550 is not an appropriate behavior at the moment.

Further, the driver assistance apparatus 500 may control the portal device 1550 based on a voice command of the driver 10 received through the microphone 123a. For example, the processor 570 may control the communication unit 520 to transmit a voice command of the driver 10 (e.g., "Check message") to the portable device 1550. The portable device 1550 may execute a specific function of the portable device 1550 according to the voice command of the driver 10 provided from the communication unit 520.

The image 1520 output to the windshield 11 may disappear from the windshield 11 according to a predetermined condition. For example, if the portable device 1550 remains still for a predetermined time, the processor 570 may control the display unit 580 not to output the image 1520 anymore. In addition, the size of the image 1520 may gradually decrease as time passes after the image 1520 was first output.

Figure 15C:
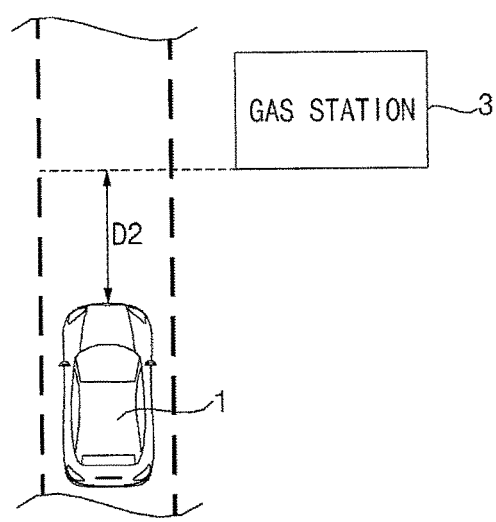

In step S1450, the processor 570 determines whether the vehicle 10 approaches objects of interest within a predetermined distance or the driver manipulates the navigation apparatus 200 of the vehicle 1, as an event related to the fourth region 714. Herein, the objects of interest may be the locations of, for example, a tollgate, a crosswalk, a destination, a gas station, a house, a point of a past accident, a school, a building and the like which are pre-registered by the driver 10. The driver assistance apparatus 500 may match the current location of the vehicle provided from the vehicle 1 with an electronic map pre-stored in the memory 130 of the vehicle 1 or the memory 540, thereby checking how far the vehicle is distanced away from the pre-registered objects of interest. For example, as shown in FIG. 15C, when the vehicle approaches a pre-registered gas station 3, which is an object of interest, within a predetermined distance D2, the processor 570 may perform step S1460, determining that the vehicle 1 has approached the object of interest within the predetermined distance D2. As another example, when the processor 570 receives a touch input of the driver through the touchscreen of the navigation apparatus, the processor 570 may perform step S1460, determining that the driver is manipulating the navigation apparatus of the vehicle 1. If the distance between the vehicle 1 and the object of interest is greater than the predetermined distance D2, and the driver does not manipulate the navigation apparatus of the vehicle 1, the processor 570 may return to step S1410.

Figure 15D:
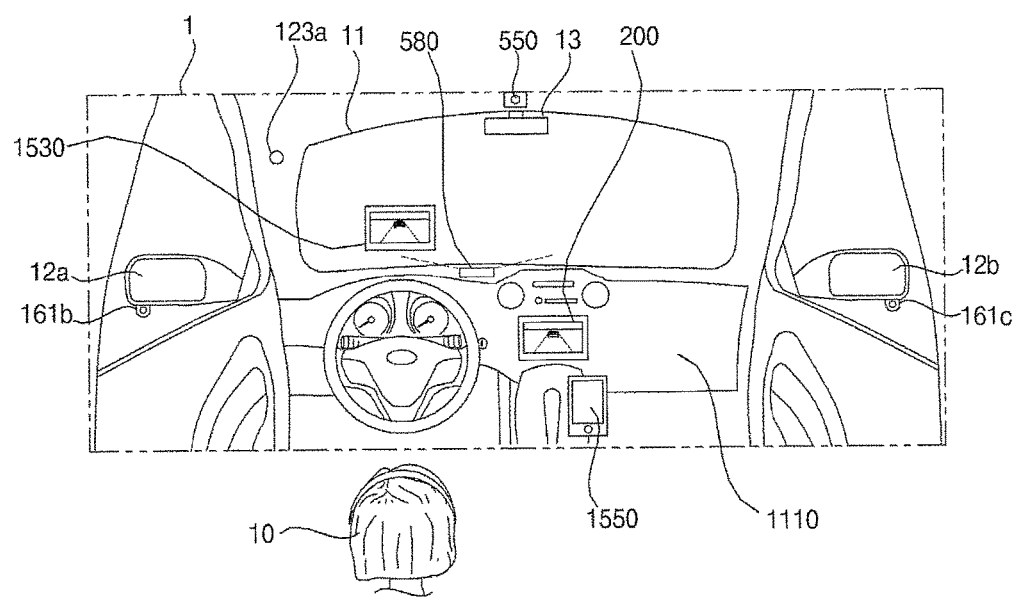

In step S1460, the driver assistance apparatus 500 may output the route guide information 1530 displayed on the navigation apparatus 200 of the vehicle 1. For example, as shown in FIG. 15D, the processor 570 may control the display unit 580 to output the route guide information provided from the vehicle 1 to the windshield 11.

Thereby, the driver 10 may check the route guide information 1530 while looking ahead, without turning eyes to the navigation apparatus 200 to check the current location of the vehicle 1 or the route to follow.

In addition, the driver assistance apparatus 500 may control the navigation apparatus 200 based on the voice command of the driver 10 received through the microphone 123a. For example, if a voice command to set a new destination is received through the microphone 123a, the processor 570 may control the navigation apparatus 200 to display route guide information for guiding a route to the new destination in place of the existing destination. Thereby, the route guide information 1530 displayed on the display unit 580 may also be changed to information about the new destination.

The image 1530 output to the windshield 11 may disappear from the windshield 11 according to a predetermined condition. For example, when a predetermined time passes from the time at which the vehicle 1 moves away from an object of interest beyond the predetermined distance, the processor 570 may control the display unit 580 not to output the image 1530 anymore. In addition, the size of the image 1530 may gradually decrease as time passes from the time at which the image 1530 was output for the first time.

Figure 16:
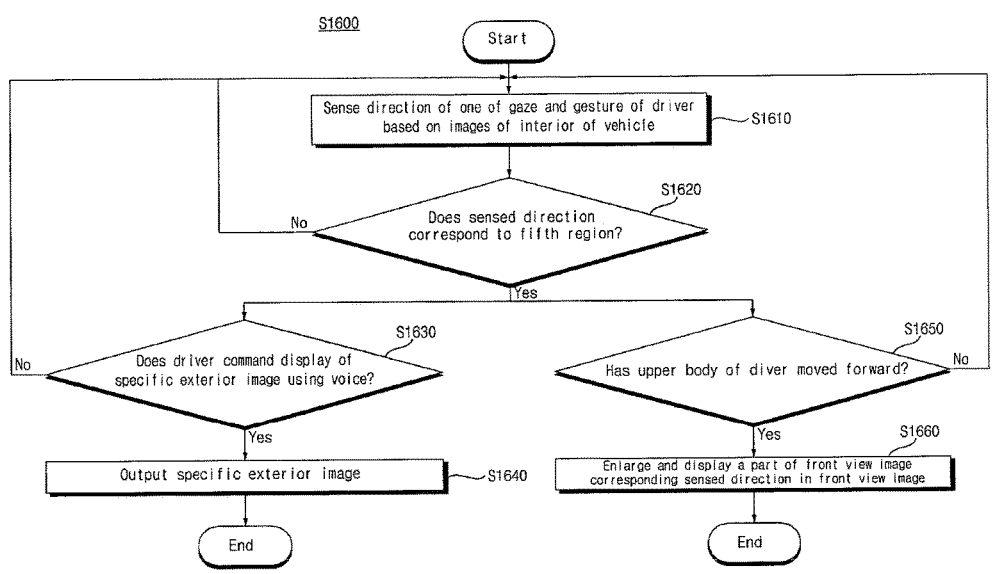
FIG. 16 is a flowchart illustrating an process performed by the driver assistance apparatus according to an embodiment of the present invention.

FIG. 16 is a flowchart illustrating an process S1600 performed by the driver assistance apparatus 500 according to an embodiment of the present invention. FIGS. 17A to 17D are views provided to aid in understanding the process S1600 illustrated in FIG. 16 according to an embodiment of the present invention.

In step S1610, the processor 570 may sense the direction of one of the gaze and gesture of the driver 10 based on the images of the interior of the vehicle 1. The camera 550 may provide images to the processor 570 in the order in which the images are captured. Alternatively, the camera 550 may provide the processor 570 with each image along with the time at which the image was captured.

In step S1620, the processor 570 determines whether the direction sensed in step S1610 corresponds to the fifth region 715. Herein, the fifth region 715 may be a region including at least one part of the windshield 11. If neither the gaze nor gesture of the driver 10 corresponds to the fifth region 715, the processor 570 may return to step S1610 or the process S1600 may be terminated.

Figure 17A:
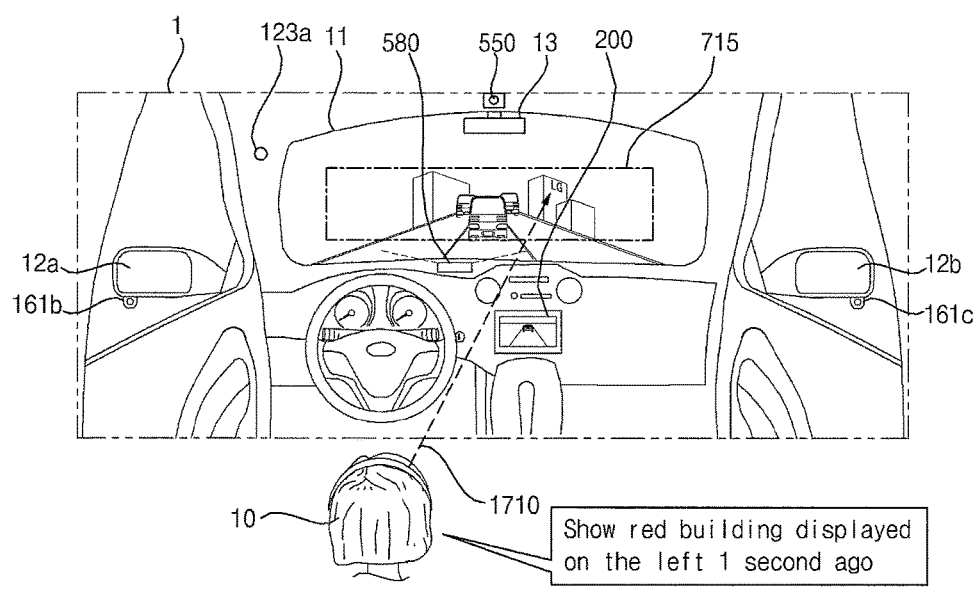
FIGS. 17A to 17D are views provided to aid in understanding the process illustrated in FIG. 16 according to an embodiment of the present invention.

Further, if it is determined that the sensed direction corresponds to the fifth region 715, the processor 570 performs at least one of steps S1630 and S1650. For example, as shown in FIG. 17A, if the gaze direction 1710 of the driver 10 points to the inside of the fifth region 715, steps S1630 and S1650 may be performed simultaneously.

In step S1630, the processor 570 determines whether a voice command to display a specific exterior image has been issued by the driver 10. In addition, the processor 570 may recognize the linguistic meaning of the voice command using voice recognition. For example, the processor 570 may sense a voice command from the driver 10 who says "Show left view image displayed 1 second ago." If no voice command is issued by the driver 10, the processor 570 may return to step S1610 or the process S1600 may be terminated. If the voice command requesting display of the specific exterior image is issued by the driver 10, the processor 570 performs step S1640.

In step S1640, the driver assistance apparatus 500 outputs the specific exterior image corresponding to the voice command of the driver 10. Specifically, the processor 570 receives images of the exterior of the vehicle 1 from a plurality of cameras 161a, 161b, 161c and 161d disposed on the exterior of the vehicle 1. If a voice command "Show left view image displayed 1 second ago" is issued by the driver 10 as in the previous example, the processor 570 may select an image provided one second before the voice command of the driver 10 is issued, from among left-view images provided from the left camera 161b and recorded in the memory 540.

Figure 17B:
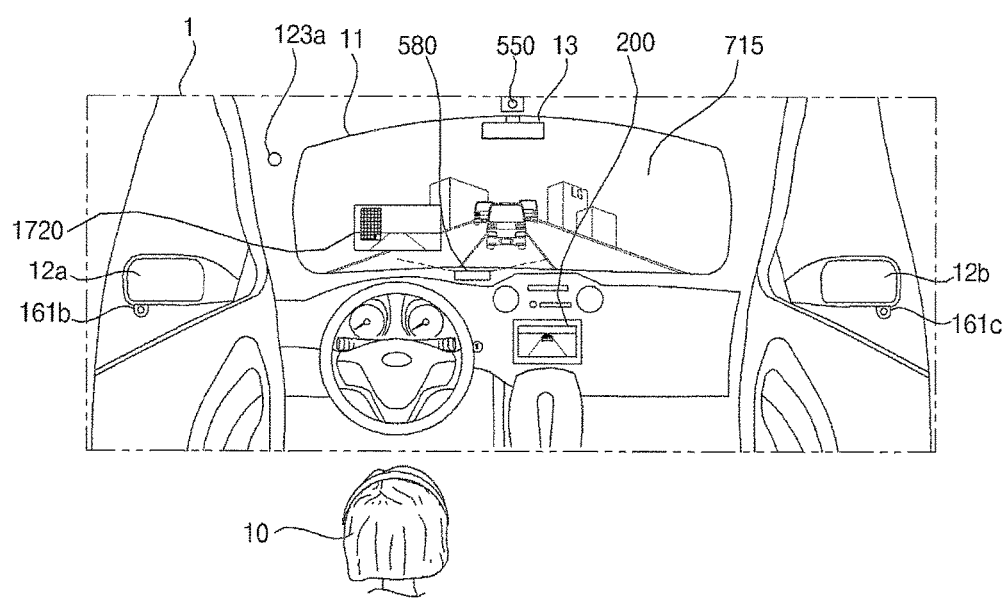

In addition, as shown in FIG. 17B, the processor 570 may control the display unit 580 to output the selected image 1720. Additionally, the processor 570 may enlarge, scale down or change the image 1720 displayed on the windshield 11 according to an additional voice command of the driver 10.

Thereby, a situation to the left, right and/or back of the vehicle 1 which the driver 10 may miss while looking ahead may be recalled and displayed on the windshield 11 whenever necessary.

Figure 17C:
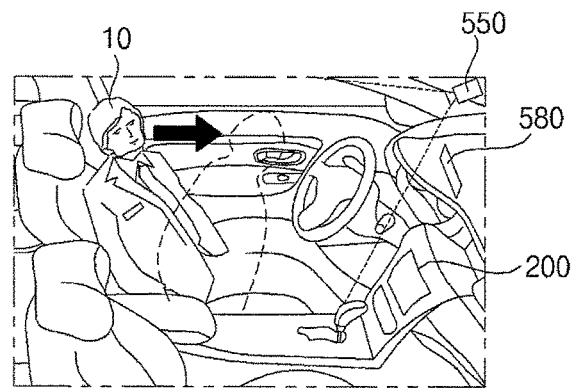

In step S1650, the processor 570 determines whether the upper body of the driver has moved forward. According to an embodiment, the processor 570 may determine whether the upper body of the driver has moved forward, based on change of the size of the upper body of the driver 10 shown in the images received from the camera 550. Specifically, as shown in FIG. 17C, if the camera 550 is disposed ahead of the driver's seat, the size of the upper body of the driver 10 shown in the images received from the camera 500 may increase when the upper body of the driver 10 moves forward. Thereby, the processor 570 may determine whether the upper body of the driver has moved forward, by comparing the sizes of the upper body of the driver 10 shown in the images received from the camera 550 according to time. For example, if the driver 10 leans the upper body toward the windshield 11 to check the front situation of the vehicle 1 or to find a specific object (e.g., a gas station) located ahead of the vehicle 1, the processor 570 may determine that the upper body of the driver 10 has moved forward. If it is determined that the upper body of the driver 10 has not moved forward, the processor 570 may return to step S1610 or the process S1600 may be terminated. If the upper body of the driver 10 moves forward, the processor 570 performs step S1660.

Figure 17D:
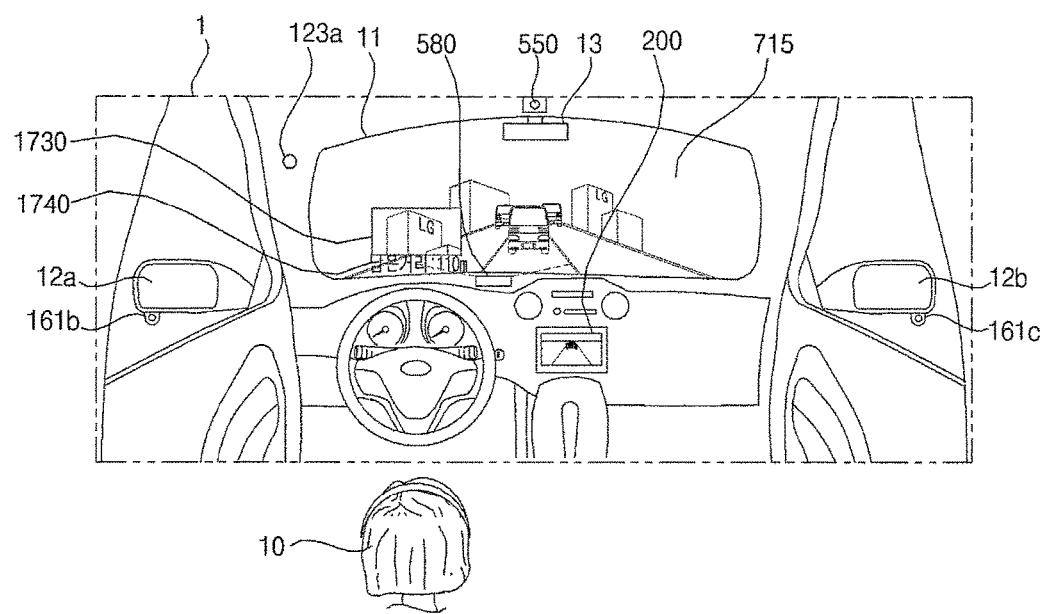

In step S1660, the processor 570 may control the display unit 580 to enlarge and display a part of the front-view image corresponding to the direction sensed in step S1610. According to an embodiment, the processor 570 may control the display unit 580 to extract a part corresponding to the direction sensed in step s1610 from the whole region of the front-view image provided from the cameras 161a and to output the extracted part to the windshield 11. For example, if the direction of the gaze and/or gesture points to a specific object (e.g., a building) located ahead of the vehicle 1 in step S1610, the processor 570 may extract a part containing the specific object from the front-view image. Thereby, as shown in FIG. 17D, the processor 570 may control the display unit 580 to display the expected partial image 1730 to one region of the windshield 11. At this time, the processor 570 may control the display unit 580 to display information 1740 about the specific object acquired from an electronic map stored in the memory 130 or the memory 540 along with the partial images 1730. In addition, if the direction sensed in step S1610 corresponds to the fifth region 715, the processor 570 may control the display unit 580 to display information about a pre-registered object of interest when an event occurs in which the vehicle 1 approaches the object of interest within a predetermined distance.

Figure 18:
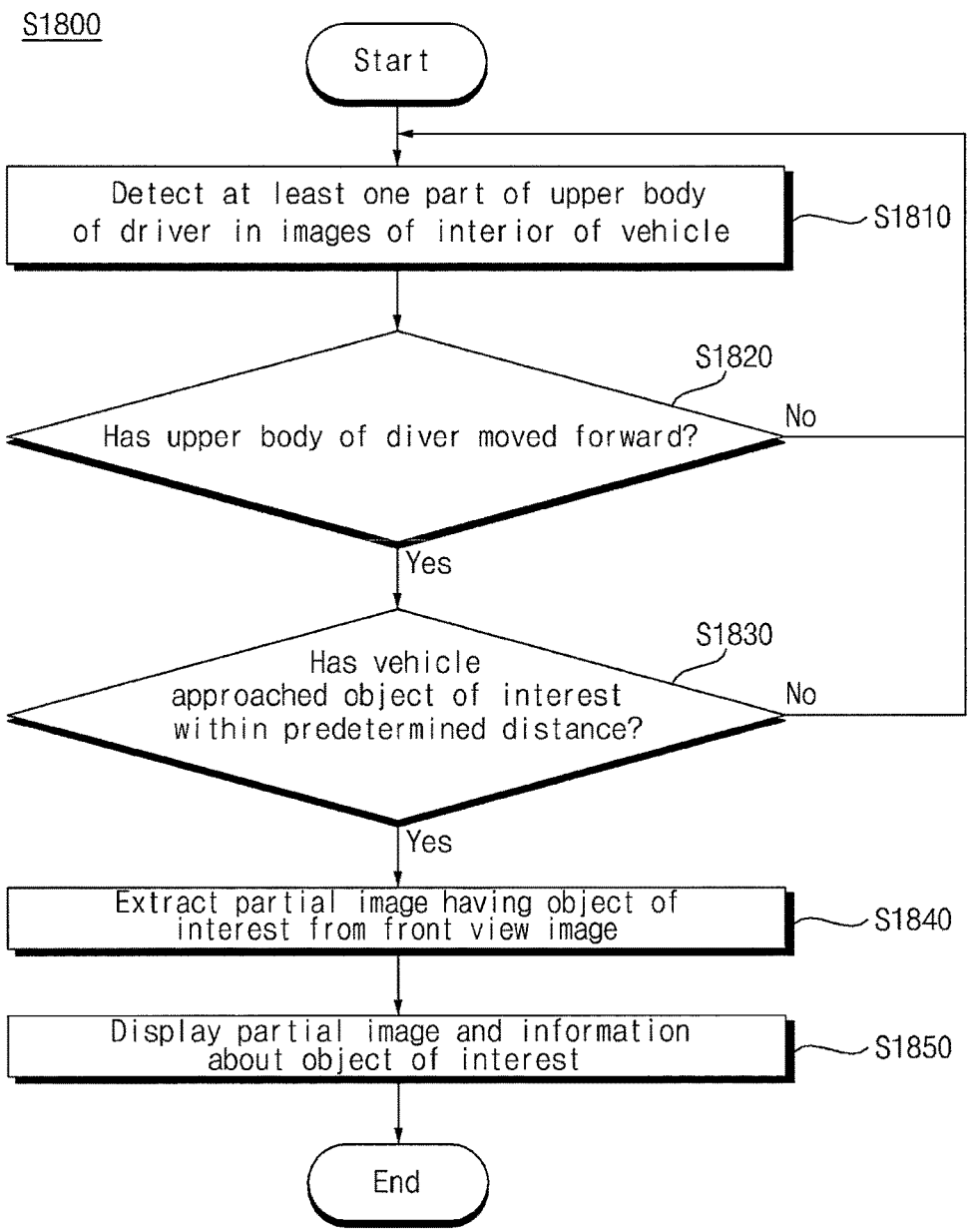
FIG. 18 is a flowchart illustrating an process performed by the driver assistance apparatus according to an embodiment of the present invention.
Figure 19A:
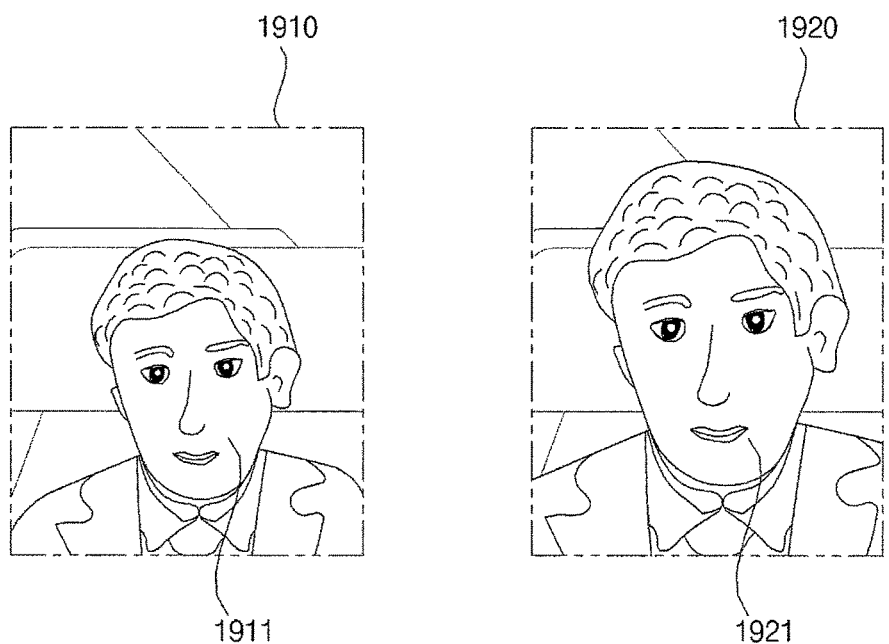
FIG. 19A and FIG. 19B are views provided to aid in understanding the process illustrated in FIG. 18 according to an embodiment of the present invention.
Figure 19B:
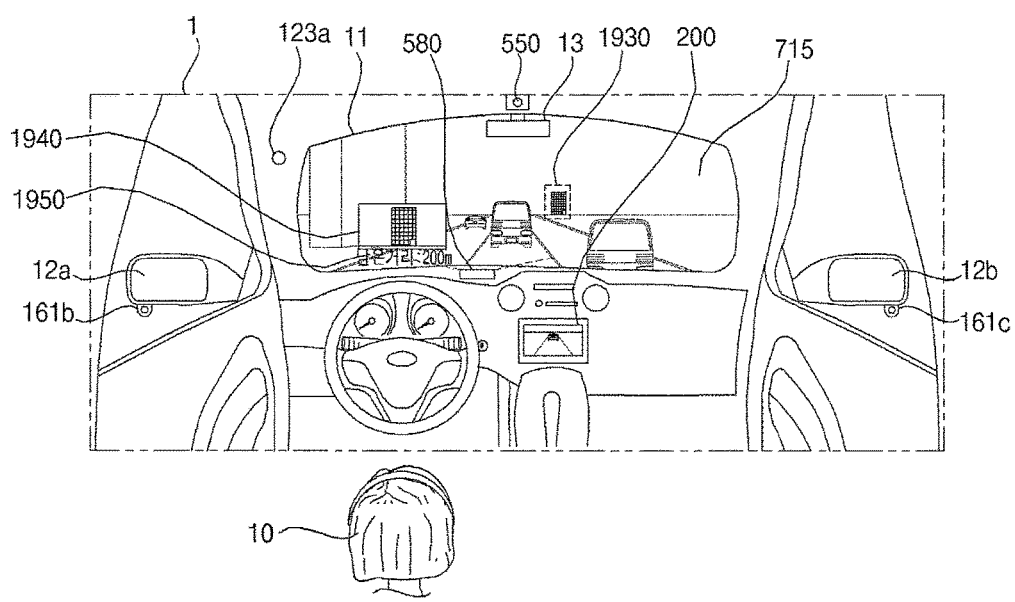

FIG. 18 is a flowchart illustrating an process S1800 performed by the driver assistance apparatus according to an embodiment of the present invention. FIG. 19A and FIG. 19B are views provided to aid in understanding the process S1800 illustrated in FIG. 18 according to an embodiment of the present invention.

In step S1810, the processor 570 detects at least one part of the upper body of the driver 10 in the images of the interior of the vehicle 1. The camera 550 may provide the processor 570 with the images in the order in which the images are captured. Alternatively, the camera 550 may provide the processor 570 with each image along with the time at which the image was captured. The processor 517 may detect the eyes, face, chest and the like of the driver 10 in the images received from the camera 550. For example, as shown in FIG. 19A, the processor 570 may detect the face 1911 of the driver 10 in an image 1910 of a first time from the camera 550, and detect the face 1921 of the driver 10 in an image 1920 of a second time after the first time.

In step S1820, the processor 570 determines whether the upper body of the driver 10 has moved forward. That is, the processor 570 may determine whether the driver 10 has leaned the upper body toward the windshield 11. For example, the driver 10 may poke the head forward to check the actual location of an object of interest which is beyond the windshield 11, as shown in FIG. 17C. In this instance, as the distance between the driver 10 and the camera 550 decreases, the size of the eyes and face of the driver 10 appearing in the images acquired by the camera 550 may increase. For example, if the driver leans the upper body forward at the second time, the size of the face 1921 in the image 1920 of the second time may be larger than the size of the face 1911 in the image 1910 of the first time. If the size of the face 1921 is larger than the size of the face 1911 by a value greater than or equal to a predetermined value or predetermined ratio, the processor 570 may determine that the upper body of the driver 10 has moved forward. Of course, the processor 570 may determine whether the upper body of the driver 10 has moved forward, based on change in size of a body part (e.g., eyes, chest) other than the face.

In step S1830, the processor 570 determines whether an event occurs in which the vehicle 1 approaches an object of interest within a predetermined distance. Herein, the object of interest may be a location or object pre-registered by the driver such as, for example, a crosswalk, a point of a past accident, a destination, a facility and the like as described above. If the distance between the vehicle 1 and the object of interest is less than or equal to a predetermined distance (300 m), the processor 570 may perform step S1840.

In step S1840, the processor 570 extracts a partial image containing the object of interest from a front view image received from the camera 161a. According to an embodiment, the camera 161 may acquire a front view image corresponding to the front view corresponding to the windshield 11, and the processor 570 may extract a partial image from the front view image based on the location of the object of interest.

In step S1850, the processor 570 controls the display unit 582 to display the partial image extracted in step S1840 and information about the object of interest. The information about the object of interest may be stored in the memory 130 or memory 540 or be provided from the navigation apparatus 200. For example, as shown in FIG. 19B, the processor 570 may control the display unit 580 to display a partial image 1940 containing the object of interest 1930 in the one region of the windshield 11. In addition, the processor 570 may control the display unit 580 to display the information 1950 about the object of interest 1930 along with the partial image 1940.

The processor 570 may adjust the size of the partial image displayed on the display unit 580 according to the distance between the vehicle 1 and the object of interest. According to an embodiment, if the distance between the vehicle 1 and the object of interest is greater than or equal to a first distance, the partial image may have a first size when displayed. If the distance between the vehicle 1 and the object of interest is a second distance (e.g., 100 m) shorter than the first distance (e.g., 200 m), the partial image may have a second size less than the first size when displayed. That is, as the distance between the vehicle 1 and the object of interest increases, the processor 570 may increase the expansion ratio for the partial image.

Figure 20:
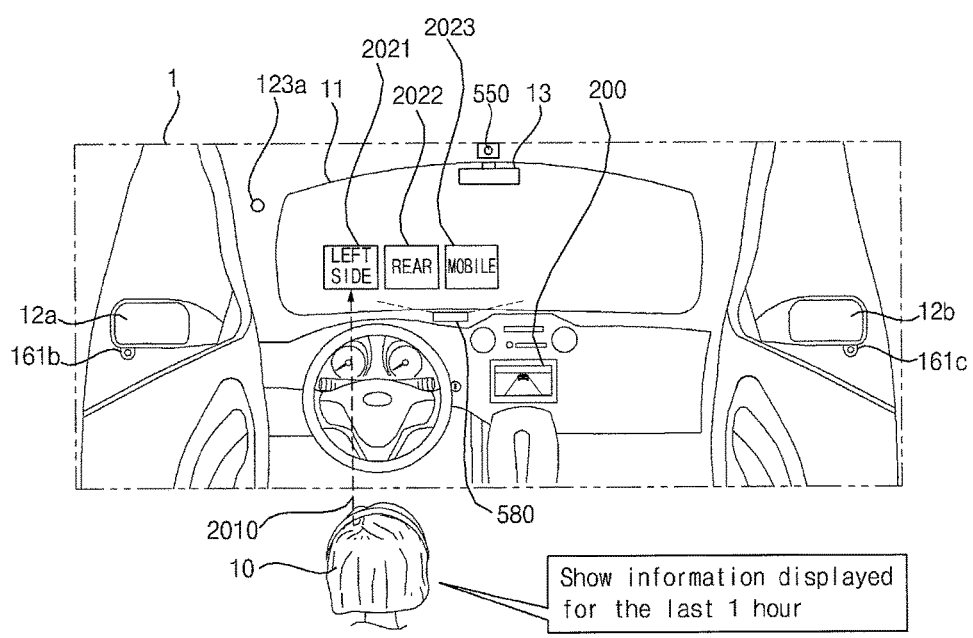
FIG. 20 is a view illustrating an operation of the driver assistance apparatus according to an embodiment of the present invention.

FIG. 20 is a view illustrating an operation of the driver assistance apparatus 500 according to an embodiment of the present invention.

Referring to FIG. 20, the driver assistance apparatus 500 may display an indicator indicating information previously output by the display unit 580, according to occurrence of an event related to a region corresponding to the direction of at least one of the gaze and/or gesture of the driver 10.

For example, suppose that the left view image 920 shown in FIG. 9C, the rearview image 1320 shown in FIG. 13C and the image 1520 of the portable device 1550 shown in FIG. 15B were sequentially displayed before the current time. In this instance, an indicator 2021 indicating the left view image 920, an indicator 2022 indicating the rearview image 1320 and an indicator 2023 indicating the image 1520 of the portable device 1550 may be displayed in one region of the windshield 11 by the display unit 580, as shown in FIG. 20.

The processor 570 may select one of the indicators 2021, 2022 and 2023 displayed on the windshield 11, based on the direction of at least one of the gaze and gesture of the driver 10. Specifically, the processor 570 may control the display unit 580 to select an indicator to which the direction of one of the gaze and gesture of the driver 10 points and to output the information indicated by the selected indicator. For example, as shown in FIG. 20, if the gaze 2010 of the driver 10 is directed to one indicator 2021 displayed on the windshield 11, the processor 570 may control the display unit 580 to display a left view image provided from the left camera 161b.

The indicators 2021, 2022 and 2023 may be displayed by the display unit 580 when a voice command of the driver 10 requesting display of previously output information is received. For example, if the driver 10 says "Show information displayed before," the processor 570 may recognize this voice command and control the display unit 580 to display the indicators 2021, 2022 and 2023.

In addition, the processor 570 may control the display unit 580 not to display at least one of the indicators 2021, 2022 and 2023 according to a voice command of the driver 10.

The processor 570 may control the display unit 580 to display only indicators indicating information output for a predetermined past duration up to the current time. For example, the processor 570 may display only indictors indicating information output in the last hour.

As the number of indicators indicting previously displayed information increases, the indicators may have a risk of interrupting the front visual field of the driver 10. Accordingly, the processor 570 may limit the number of indicators to be displayed on the windshield 11 such that the number is less than or equal to a predetermined number. For example, if the number of previously displayed information items is six, the processor 570 may control the display unit 580 to display only three indicators indicating only three of the most frequently displayed pieces of information.

As is apparent from the above description, the present invention can have the following effects.

According to at least one embodiment of the present invention, information currently necessary for the driver may be determined and output based on the gaze and gesture of the driver. Thereby, the driver may be assisted in looking ahead while driving the vehicle. As a result, a risk of having an accident caused by failing to look ahead may be reduced.

In addition, according to at least one embodiment of the present invention, only when an event related to a region corresponding to at least one of the gaze and gesture of the driver occurs, may information related to the region be displayed. Thereby, information not desired by the driver may be prevented from being provided to the driver.

Effects of the present invention are not limited to the aforementioned effects, and other effects of the present invention which are not mentioned above will become apparent to those having ordinary skill in the art from the claims.

The embodiments of the present invention described above can be implemented not only through an apparatus and method but also through a program for implementing functions corresponding to configurations of the embodiments and a recording medium on which the program is recorded. In addition, those skilled in the art will easily implement the present invention based on the description of the embodiments given above.

In addition, those skilled in the art will appreciate that various modifications, additions and substitutions are possible, without departing from the scope and spirit of the invention as disclosed in the accompanying claims. Accordingly, various modifications can be made to the present invention by selectively combining all or some of the respective embodiments without being limited to the embodiments described above and the accompanying drawings.

What is claimed is:

1. A driver assistance apparatus comprising:
a display unit;
a camera configured to capture an image of an interior of a vehicle; and
a processor configured to:
sense a direction of at least one of a gaze and a gesture of a driver based on images provided from the camera, detect a region corresponding to the direction from among a plurality of predetermined regions of the vehicle, and
control the display unit to output information related to the detected region in response to an occurrence of an event related to the detected region among a plurality of predetermined events,
wherein the processor is further configured to:
detect at least one part of an upper body of the driver in the images provided from the camera of the interior of the vehicle,
determine whether the upper body of the driver has moved forward based on a change of a size of the upper body of the driver shown in the images provided from the camera,
extract a partial image containing an object of interest from an image related to the detected region, and
control the display unit to display the partial image containing the object of interest based on whether the upper body of the driver has moved forward, and
wherein the processor is further configured to:
control the display unit to display information about the object of interest along with the partial image, and
adjust a size of the partial image displayed on the display unit according to a distance between the vehicle and the object of interest.

2. The driver assistance apparatus according to claim 1, wherein the display unit comprises at least one of a head up display (HUD) and a transparent display, the HUD being disposed on one side of a dashboard to project information related to the detected region and the transparent display being disposed on a windshield of the vehicle.

3. The driver assistance apparatus according to claim 1, wherein the plurality of predetermined regions comprises a first region containing a left side-view mirror of the vehicle, wherein an event related to the first region comprises turning on a left turn signal light of the vehicle.

4. The driver assistance apparatus according to claim 3, wherein information related to the first region comprises a left view image of the vehicle provided from a left camera of the vehicle.

5. The driver assistance apparatus according to claim 3, wherein, when the direction points to the first region, the processor activates a lane change support function of the vehicle in response to an occurrence of the event related to the first region.

6. The driver assistance apparatus according to claim 1, wherein the plurality of predetermined regions comprises a second region containing a right side-view mirror of the vehicle, and
wherein an event related to the second region comprises turning on a right turn signal light of the vehicle.

7. The driver assistance apparatus according to claim 6, wherein information related to the second region comprises a right view image of the vehicle provided from a right camera of the vehicle.

8. The driver assistance apparatus according to claim 6, wherein, when the direction points to the second region, the processor activates a lane change support function of the vehicle in response to an occurrence of the event related to the second region.

9. The driver assistance apparatus according to claim 1, wherein the plurality of predetermined regions comprises a third region containing a rearview mirror of the vehicle, and
wherein an event related to the third region comprises another vehicle approaching within a predetermined distance from a rear of the vehicle.

10. The driver assistance apparatus according to claim 9, wherein information related to the third region comprises a rearview image of the vehicle provided from a rear camera of the vehicle.

11. The driver assistance apparatus according to claim 1, wherein the plurality of predetermined regions comprises a third region containing a rearview mirror of the vehicle, and
wherein an event related to the third region comprises receiving a voice of a passenger in the vehicle.

12. The driver assistance apparatus according to claim 11, wherein information related to the third region comprises an image of the passenger.

13. The driver assistance apparatus according to claim 1, wherein the plurality of predetermined regions comprises a fourth region containing at least one part of a center console of the vehicle, and
wherein an event related to the fourth region comprises a movement of a portable device in the vehicle.

14. The driver assistance apparatus according to claim 13, wherein information related to the fourth region comprises an image displayed by the portable device.

15. The driver assistance apparatus according to claim 1, wherein the plurality of predetermined regions comprises a fifth region containing at least one part of a windshield of the vehicle, and
wherein an event related to the fifth region comprises receiving a voice of the driver commanding displaying of a specific exterior image of the vehicle.

16. The driver assistance apparatus according to claim 15, wherein information related to the firth region comprises the specific exterior image.

17. The driver assistance apparatus according to claim 1, wherein the plurality of predetermined regions of the vehicle comprises a fourth region containing at least one part of a center console of the vehicle and a fifth region containing at least one part of a windshield of the vehicle, and
wherein an event related to the fourth region and the fifth region comprises the vehicle approaching within a predetermined distance from a predetermined object of interest.

18. The driver assistance apparatus according to claim 17, wherein information related to the fourth region comprises route guide information, and
wherein information related to the fifth region comprises information about the object of interest.

19. The driver assistance apparatus according to claim 1, wherein the processor is further configured to:
control the display unit to display an indicator guiding information previously output by the display unit,
determine whether the gaze of the driver is directed to the indicator displayed by the display unit, and
control the display unit to output the information guided by the indicator.

* * * * *